US012752591B2

(12) United States Patent
Bae et al.

(10) Patent No.: US 12,752,591 B2
(45) Date of Patent: Oct. 6, 2026

(54) REFRIGERATING OR WARMING APPARATUS, AND VEHICLE

(71) Applicant: LG ELECTRONICS INC., Seoul (KR)

(72) Inventors: Jaehyun Bae, Seoul (KR); Duchan Ki, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 18/108,254

(22) Filed: Feb. 10, 2023

(65) Prior Publication Data

US 2023/0182530 A1 Jun. 15, 2023

Related U.S. Application Data

(63) Continuation of application No. 16/486,865, filed as application No. PCT/KR2018/001861 on Feb. 13, 2018, now Pat. No. 11,618,299.

(30) Foreign Application Priority Data

Feb. 17, 2017 (KR) ........................ 10-2017-0021560

(51) Int. Cl.
*F25D 23/00* (2006.01)
*B60H 1/00* (2006.01)
(Continued)

(52) U.S. Cl.
CPC ....... *B60H 1/0055* (2013.01); *B60H 1/00592* (2013.01); *B60N 3/104* (2013.01);
(Continued)

(58) Field of Classification Search
CPC ................. F25D 23/003; F25D 31/005; F25D 2323/00265; F25D 2323/00276;
(Continued)

(56) References Cited

U.S. PATENT DOCUMENTS 1,841,617 A * 1/1932 Lipman ................. F25D 23/006 62/450
2,226,444 A * 12/1940 Caulk, Jr. ............. F25D 23/003 62/507
(Continued)

FOREIGN PATENT DOCUMENTS

CN 2443869 8/2001
CN 1500740 6/2004
(Continued)

OTHER PUBLICATIONS

KR-20030078475-A Translation (Year: 2003).*
(Continued)

*Primary Examiner* — David J Teitelbaum
(74) *Attorney, Agent, or Firm* — KED & ASSOCIATES, LLP

(57) ABSTRACT

Provided is a refrigerating or warming apparatus. The refrigerating or warming apparatus may include a cavity or compartment of which at least a portion of a wall is provided as a vacuum adiabatic body, a machine room disposed at a side outside the cavity, a compressor accommodated in the machine room to compress a refrigerator, a first heat exchange module or assembly accommodated in the machine room to allow the refrigerant to be heat-exchanged, a second heat exchange module or assembly accommodated in the cavity to allow the refrigerant to be heat-exchanged, and a machine room cover which covers the machine room to separate air flow passages where an internal air flow and an external air flow have directions opposite to each other.

20 Claims, 19 Drawing Sheets
(4 of 19 Drawing Sheet(s) Filed in Color)

(51) Int. Cl.
*B60N 3/10* (2006.01)
*F25D 31/00* (2006.01)

(52) U.S. Cl.
CPC .......... *F25D 23/003* (2013.01); *F25D 31/005* (2013.01); *F25D 2323/00265* (2013.01); *F25D 2323/00276* (2013.01)

(58) Field of Classification Search
CPC ........... F25D 2323/0021; F25D 23/006; B60N 3/104; B60H 1/0055; B60H 1/00592; F24F 1/24; F24F 1/027
See application file for complete search history.

(56) References Cited

U.S. PATENT DOCUMENTS

| | | | | |
|---|---|---|---|---|
| 3,161,265 | A * | 12/1964 | Matsch | E04B 1/803 52/794.1 |
| 4,545,211 | A * | 10/1985 | Gaus | B60H 1/00592 62/115 |
| 4,637,222 | A | 1/1987 | Fujiwara et al. | |
| 4,759,190 | A | 7/1988 | Trachtenberg et al. | |
| 5,749,235 | A * | 5/1998 | Ueda | B60H 1/00314 62/238.7 |
| 6,704,202 | B1 | 3/2004 | Hamaoka et al. | |
| 10,160,365 | B2 | 12/2018 | Ranalli et al. | |
| 2006/0117778 | A1 | 6/2006 | Oh et al. | |
| 2009/0013713 | A1 | 1/2009 | Cho et al. | |
| 2009/0031659 | A1* | 2/2009 | Kalfon | H05K 5/0209 137/511 |
| 2009/0058120 | A1 | 3/2009 | Ioka et al. | |
| 2010/0018230 | A1 | 1/2010 | Ihle | |
| 2015/0362229 | A1 | 12/2015 | Oh et al. | |
| 2017/0176056 | A1* | 6/2017 | Eicher | F24F 3/1405 |
| 2019/0381923 | A1 | 12/2019 | Kim et al. | |
| 2020/0223344 | A1 | 7/2020 | Kang et al. | |

FOREIGN PATENT DOCUMENTS

| | | | |
|---|---|---|---|
| CN | 2691933 | | 4/2005 |
| CN | 1782620 | | 6/2006 |
| CN | 101069052 | | 11/2007 |
| CN | 101080602 | | 11/2007 |
| CN | 102494465 | | 6/2012 |
| CN | 203116352 | | 8/2013 |
| CN | 103453630 | | 12/2013 |
| CN | 103528304 | | 1/2014 |
| CN | 105150901 | | 12/2015 |
| CN | 205536749 | | 8/2016 |
| CN | 110248840 | | 9/2019 |
| CN | 110248842 | | 9/2019 |
| JP | H05-26563 | | 2/1993 |
| JP | 11-223451 | | 8/1999 |
| KR | 10-2003-0078474 | | 10/2003 |
| KR | 20030078475 | A * | 10/2003 |
| KR | 10-2007-0069058 | | 7/2007 |
| KR | 10-0848512 | | 7/2008 |
| KR | 10-2009-0006418 | | 1/2009 |
| RU | 5951 | | 2/1998 |
| RU | 16715 | | 2/2001 |
| WO | WO 02/00458 | | 1/2002 |
| WO | WO 2011/021798 | | 2/2011 |
| WO | WO 2017/023077 | | 2/2017 |
| WO | WO 2017/023100 | | 2/2017 |

OTHER PUBLICATIONS

Chinese Office Action dated Mar. 31, 2023 issued in Application No. 202210152222.X.
Chinese Office Action dated Mar. 31, 2023 issued in Application No. 202210153185.4.
International Search Report and Written Opinion dated Jun. 19, 2018 issued in Application No. PCT/KR2018/001861.
Russian Decision to Grant dated May 28, 2020 issued in Application No. 2019129086 (English translation attached).
Russian Search Report dated May 27, 2020 issued in Application No. 2019129086 (English translation attached).
European Search Report issued in Application No. 18754627.0 dated Nov. 25, 2020.
Chinese Office Action dated Apr. 30, 2021 issued in CN Application No. 201880012558.8.
Russian Office Action dated Jan. 17, 2022 issued in RU Application No. 2020124274.
U.S. Office Action dated Jun. 8, 2022 issued in parent U.S. Appl. No. 16/486,865.
Korean Office Action dated Jul. 20, 2023 issued in Application No. 10-2017-0021560.
Extended European Search Report dated Jun. 4, 2025 issued in Application No. 25160633.1.

* cited by examiner

REFRIGERATING OR WARMING APPARATUS, AND VEHICLE

CROSS-REFERENCE TO RELATED APPLICATIONS

This application is a Continuation application of prior U.S. patent application Ser. No. 16/486,865 filed Aug. 19, 2019, which is a U.S. National Stage Application under 35 U.S.C. § 371 of PCT Application No. PCT/KR2018/001861, filed Feb. 13, 2018, which claims priority to Korean Patent Application No. 10-2017-0021560, filed Feb. 17, 2017, whose entire disclosures are hereby incorporated by reference.

BACKGROUND

1. Field

The present disclosure relates to a refrigerating or warming apparatus and a vehicle.

2. Background

Refrigerators are apparatuses for storing products such as foods received in the refrigerator at a low temperature including sub-zero temperatures. As a result of this action, there is an advantage that a user's access or intake with respect to the products may be improved, or a storage period of the products may be lengthened.

Refrigerators are classified into indoor refrigerators using a commercial power source or outdoor refrigerators using a portable power source. In addition, in recent years, a refrigerator for a vehicle, which is used after it is fixedly mounted on the vehicle, is increasing in supply. The refrigerator for the vehicle is further increasing in demand due to an increase in supply of vehicles and an increase in premium-class vehicles.

A conventional configuration of the refrigerator for the vehicle will be described.

First, there is an example in which heat in the refrigerator is forcibly discharged to an outside of the refrigerator by using a thermoelement. However, there is a limitation in that a cooling rate is slow due to low thermal efficiency of the thermoelement, which may deteriorate user's satisfaction.

For another example, there is an example in which a refrigerant or cold air is drawn from an air conditioning system installed for air-conditioning an entire interior of the vehicle and used as a cooling source for the refrigerator for the vehicle.

In this example, there is a disadvantage that a separate flow path of air or refrigerant is required to draw the air or refrigerator from the air conditioning system of the vehicle. Also, there is a limitation that low-temperature energy is lost during the movement of the air or refrigerant through the flow path. Also, there is a limitation that a position at which the refrigerator for the vehicle is installed is limited to a position that is adjacent to the air conditioning system of the vehicle due to the above-described limitations.

For another example, there is an example in which a refrigeration cycle using a refrigerant is applied.

In this example, since a part constituting the refrigeration cycle is large in size, most of the parts are mounted on a trunk, and only a door of the refrigerator is opened to the inside of the vehicle. In this case, there is a limitation that a position for installing the refrigerator for the vehicle is limited. Also, there is a limitation that the trunk is significantly reduced in volume to reduce an amount of cargo that is capable of being loaded in the trunk.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments will be described in detail with reference to the following drawings in which like reference numerals refer to like elements wherein.

DETAILED DESCRIPTION

Figure 1:
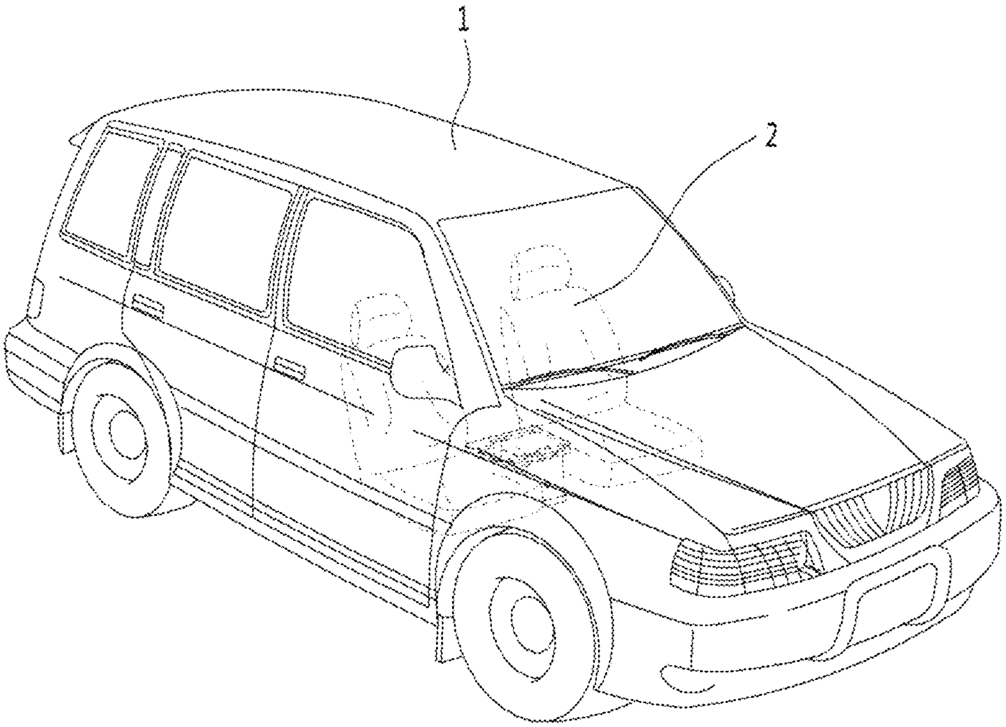
FIG. 1 is a perspective view of a vehicle according to an embodiment.

In the following description according to embodiments with reference to the drawings, the same reference numerals are given to different drawings in the case of the same constituents.

Also, in the description of each drawing, the description will be made with reference to the direction in which the vehicle is viewed from the front of the vehicle, rather than the front viewed by the driver based on the traveling direction of the vehicle. For example, the driver is on the right, and the assistant driver or passenger is on the left.

FIG. 1 is a perspective view of a vehicle according to an embodiment.

Referring to FIG. 1, a seat 2 on which a user is seated is provided in a vehicle 1. The seat 2 may be provided in a pair to be horizontally spaced apart from each other. A console is provided between the seats 2, and a driver places items that are necessary for driving or components that are necessary for manipulating the vehicle in the console. Front seats on which the driver and the assistant driver or passenger are seated may be described as an example of the seats 2.

It should be understood that the vehicle includes various components, which are necessary for driving the vehicle, such as a moving device such as a wheel, a driving device such as an engine, and a steering device such as a steering wheel.

The refrigerator for the vehicle according to an embodiment may be preferably placed in the console. However, an embodiment of the present disclosure is not limited thereto. For example, the vehicle refrigerator may be installed in various spaces. For example, the vehicle refrigerator may be installed in a space between rear seats, a door, a glove box, and a center fascia. This is one of factors that the vehicle refrigerator according to an embodiment is capable of being installed only when power is supplied, and a minimum space is secured. However, it is an advantage of the embodiment in that it may be installed in the console between the seats, which is limited in space due to limitations in vehicle design.

Figure 2:
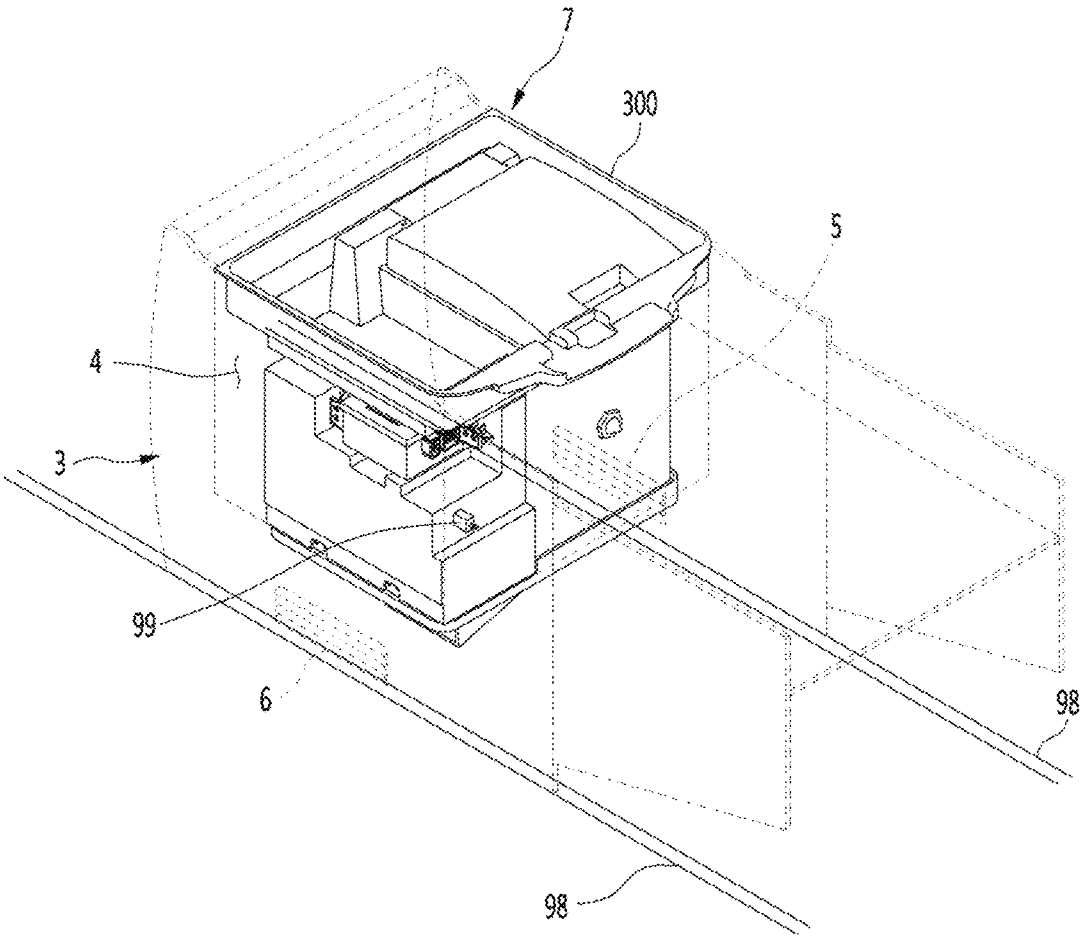
FIG. 2 is an enlarged perspective view illustrating a console of the vehicle.

FIG. 2 is an enlarged perspective view illustrating the console of the vehicle.

Referring to FIG. 2, a console 3 may be provided as a separate part that is made of a material such as a resin. A steel frame 98 may be further provided below the console 3 to maintain strength of the vehicle, and a sensor part 99 such as a sensor may be provided in a spacing part between the console 3 and the steel frame 98. The sensor part 99 may be a part that is necessary for accurately sensing an external signal and measuring a signal at a position of the driver. For example, an airbag sensor that directly impacts the life of the driver may be mounted.

The console 3 may have a console space 4 therein, and the console space 4 may be covered by a console cover or a cover 300. The console cover 300 may be fixed to the console 3 in a fixed type. Thus, it is difficult for external foreign substances to be introduced into the console through the console cover 300. A vehicle refrigerator 7 is seated in the console space 4.

A suction port 5 may be provided in a first or right surface of the console 3 to introduce air within the vehicle into the console space 4. The suction port 5 may face the driver. An exhaust port 6 may be provided in a second or left surface of the console 3 to exhaust warmed air while the vehicle refrigerator operates from the inside of the console space 4. The exhaust port 6 may face the assistant driver or passenger. A grill may be provided in each of the suction port 5 and the exhaust port 6 to prevent a user's hand from being inserted and thereby to provide safety, prevent a falling object from being introduced, and allow air to be exhausted to flow downward so as not to be directed to the person.

Figure 3:
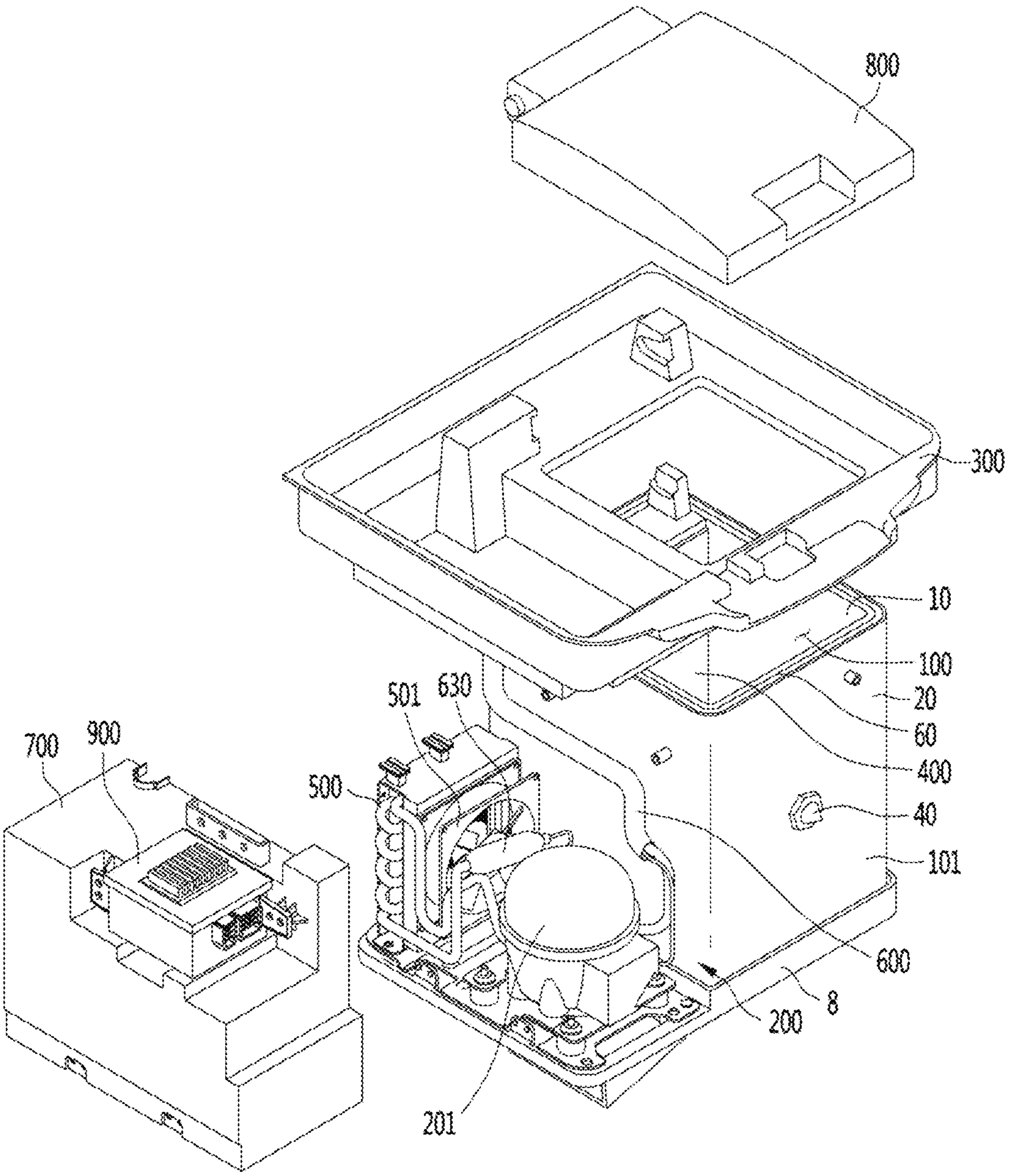
FIG. 3 is a schematic perspective view illustrating the inside of a vehicle refrigerator.

FIG. 3 is a schematic perspective view illustrating the inside of the vehicle refrigerator.

Referring to FIG. 3, the vehicle refrigerator 7 includes a refrigerator bottom frame or a refrigerator base 8 supporting parts, a machine room 200 provided in a left side of the refrigerator bottom frame 8, and a cavity or compartment 100 provided in a right side of the refrigerator bottom frame 8. The machine room 200 may be covered by a machine room cover 700, and an upper side of the cavity 100 may be covered by the console cover 300 and a door 800.

The machine room cover 700 may not only guide a passage of the cooling air, but also prevent foreign substances from being introduced into the machine room 200.

In more detail, air flows (a first flow) into a spacing part or gap between the machine room cover 700 and the console cover 300 and then flows (a second flow) into the machine room cover 700. Also, the first flow and the second flow are provided in opposite directions. Thus, cooling performance may be maximized in the narrow space.

A controller 900 may be disposed on the machine room cover 700 to control an overall operation of the vehicle refrigerator 7. Since the controller 900 is installed at the above-described position, the vehicle refrigerator 7 may operate without problems in a proper temperature range in a narrow space inside the console space 4. That is to say, the controller 900 may be cooled by air flowing through a gap between the machine room cover 700 and the console cover 300 and separated from an inner space of the machine room 200 by the machine room cover 700. Thus, the controller 900 may not be affected by heat within the machine room 200.

The console cover 300 may not only cover an opened upper portion or top of the console space 4, but also cover an upper end edge of the cavity 100. A door 800 may be further installed on the console cover 300 to allow the user to cover an opening through which products are accessible to the cavity 100. The door 800 may be opened by using rear portions of the console cover 300 and the cavity 100 as hinge points. Here, the opening of the console cover 300, the door 800, and the cavity 100 may be performed by conveniently manipulating the door 800 by the user because the console cover 300, the door 800, and the cavity 100 are horizontally provided when viewed from the user and also disposed at a rear side of the console.

A condensation module or assembly 500, a dryer 630, and a compressor 201 may be successively installed in the machine room 200 in a flow direction of the cooling air. A refrigerant conduit 600 for allowing the refrigerant to smoothly flow is provided in the machine room 200. A portion of the refrigerant conduit 600 may extend to the inside of the cavity 100 to supply the refrigerant. The refrigerant conduit 600 may extend to the outside of the cavity 100 through the upper opening through which the products are accessible to the cavity 100.

The cavity 100 has an opened top surface or a top opening and five surfaces that are covered by a vacuum adiabatic body 101. Each of surfaces of the cavity 100 may be thermally insulated by an individual vacuum adiabatic body or at least one or more vacuum adiabatic bodies communicating with each other. The cavity 100 may be provided by the vacuum adiabatic body 101. Also, the cavity 100 through which the products are accessible through one surface opened by the vacuum adiabatic body 101 may be provided.

The vacuum adiabatic body 101 may include a first plate member 10 providing a boundary of a low-temperature inner space of the cavity 100, a second plate member 20 providing a boundary of a high-temperature outer space, and a conductive resistance sheet 60 blocking heat transfer between the plate members 10 and 20. Since the vacuum adiabatic body 101 has a thin adiabatic thickness to maximally obtain adiabatic efficiency, a large capacity of the cavity 100 may be realized.

An exhaust and getter port or an exhaust port 40 for exhaust of the inner space of the vacuum adiabatic body 101 and for installing a getter that maintains the vacuum state may be provided on one surface. The exhaust and getter port 40 may provide an exhaust and getter together to better contribute to miniaturization of the vehicle refrigerator 7.

Details of the vacuum adiabatic body 101 will be described later.

An evaporation module or assembly 400 may be installed in the cavity 100 provided as the vacuum adiabatic body 101. The evaporation module 400 may forcibly blow the evaporation heat introduced into the cavity 100 through the refrigerant conduit 600 into the cavity 100. The evaporation module may be provided at a rear side within the cavity 100.

Figure 4:
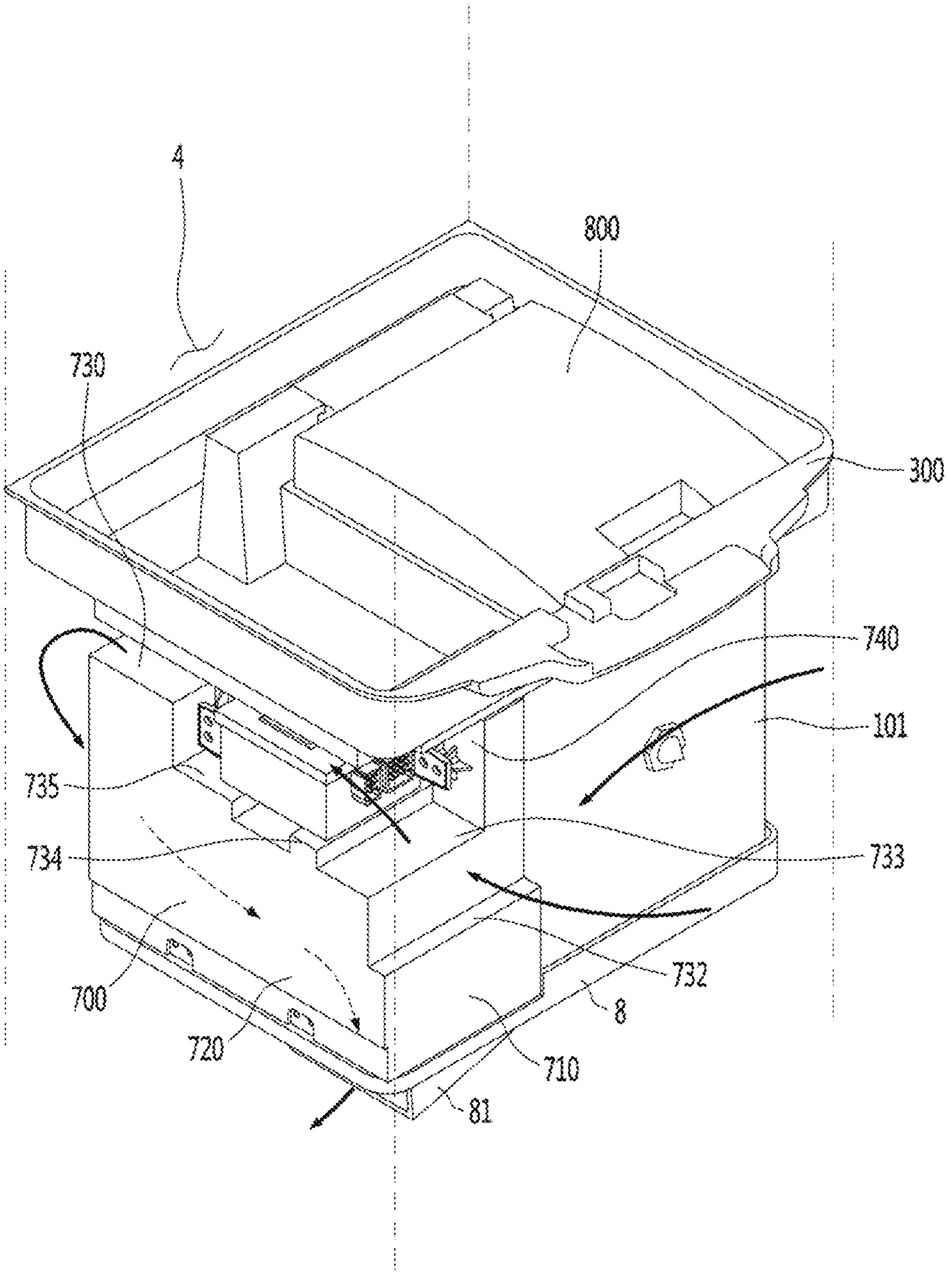
FIG. 4 is a view for explaining an air flow outside a machine room of the vehicle refrigerator.

FIG. 4 is a view for explaining an air flow outside a machine room of the vehicle refrigerator.

Referring to FIG. 4, air introduced into the suction port 5 moves to a left side of the vehicle refrigerator through a space between the vacuum adiabatic body 101 defining a front wall of the cavity 100 and an inner front surface of the console space 4. Since a heating source is not provided at a right side of the vehicle refrigerator, the suction air may be maintained at its original temperature.

The air moving to the left side of the vehicle refrigerator may be changed in direction to a rear side to move along a top surface of the machine room cover 700 outside the machine room 200.

To smoothly guide the air flow, the machine room cover 700 may have a height that gradually increases backward from a front surface 710. Also, to provide a region in which the controller 900 is disposed, and prevent the parts within the machine room 200 from interfering in position with each other, a stepped part may be disposed on a top surface of the machine room cover 700.

In detail, a first step portion or part 732, a second stepped part or portion 733, and a third stepped part or portion 735 may be successively provided backward from the front surface. A controller placing part 734 having the same height as the third stepped part is disposed on the second stepped part 733. According to this structure, the controller 900 may be disposed in parallel to the third stepped part 735 and the controller placing part 734.

The air moving along the top surface of the machine room cover 700 may cool the controller 900 on the flow path. Although the air may be slightly heated while cooling the controller 900, a degree of the temperature rise may be insignificant.

The air moving up to a rear side of the machine room cover 700 flows downward. A large cover suction hole (see reference numeral 751 of FIG. 5) that is opened in a rear surface of the machine room cover 700 may be provided. For this, a predetermined space may be provided between the rear surface of the machine room cover 700 and a rear surface of the console space 4 or the console 3.

The flow within the machine room 200 will be described with reference to the bottom perspective view of the machine room cover 700 in FIG. 5 and the view of the machine room 200, from which the machine room cover 700 is removed, in FIG. 6.

Figure 5:
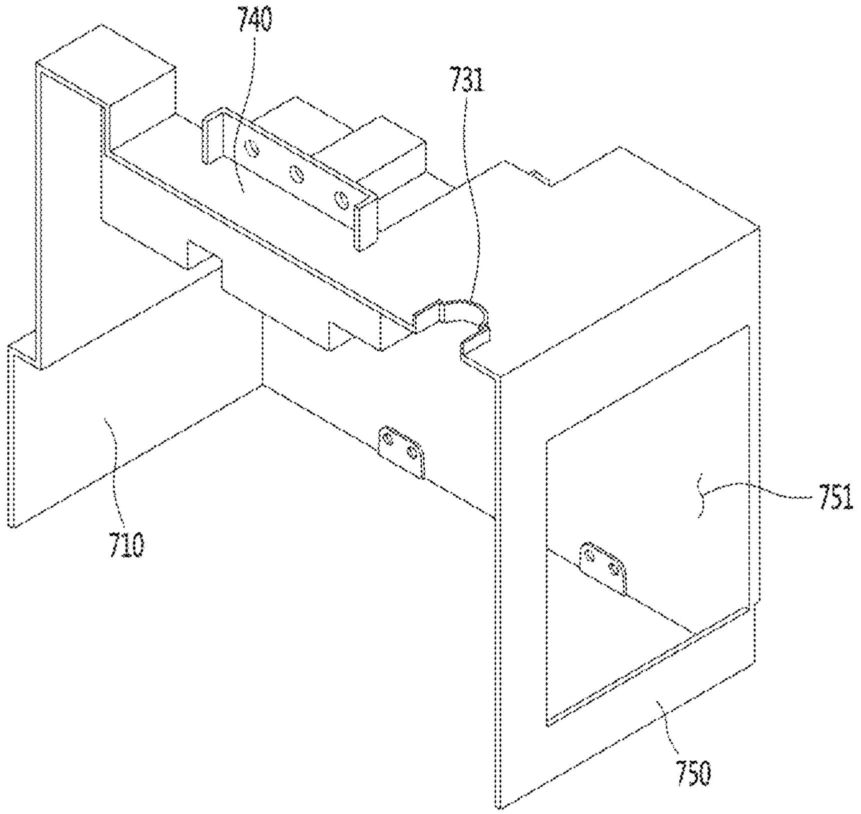
FIG. 5 is a bottom perspective view of a machine room cover.
Figure 6:
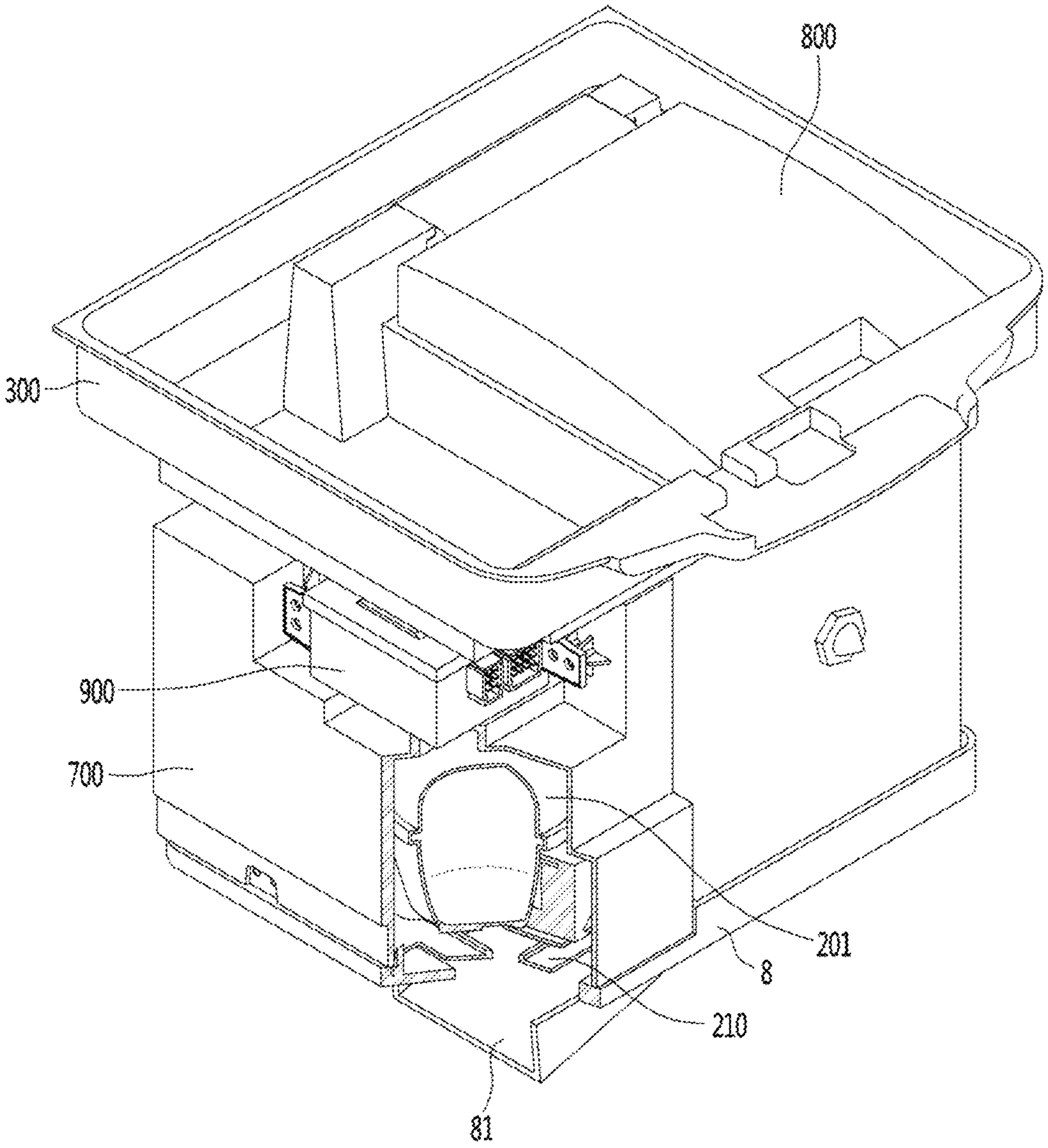
FIG. 6 is a view illustrating the inside of the machine room from which the machine room cover is removed.

Referring to FIGS. 4 to 6, a cover suction hole or a rear opening 751 is provided in a rear surface 750 of the machine room cover 700. Air may be introduced forward from the rear surface 750 of the machine room cover 700 through the cover suction hole 751.

The air introduced through the cover suction hole 751 may pass through the condensation module 500 to perform a condensation action of the refrigerant and thereby to be heated. Then, heat exchange action with respect to a drier 630 and an expansion valve is performed. Thereafter, the refrigerant cools the compressor 201 and is discharged to a bottom surface of the machine room 200.

The refrigerant discharged from the machine room 200 is discharged to a left side through a hole defined in a machine room bottom frame or base 210 provided below the compressor 201 and the passage guide 81 of the refrigerator bottom frame 8. The passage guide 81 is aligned with the exhaust port 6 of the console 3, and the heated air is discharged to the assistant driver or passenger. Here, to prevent inconvenience to the assistant driver, a grill of the exhaust port 6 is provided to be inclined downward, and hot air may be discharged to the under seat of the assistant driver.

The air flow will be described again with respect to a flow direction.

First, the air is generally suctioned from the driver and generally discharged toward the passenger, i.e., the left direction.

In detail, there is a path through which the air suctioned from the right side or a first side through the suction port 5 moves in the left direction from the cavity 100 to the machine room 200, a path through which the air moves from a region of machine room 200 to the outside of the machine room 200, a path through which the air moves downward from an upper side of the machine room 200, a path through which the air moves forward from the inside of the machine room 200, a path through which the air moves downward from a front portion of the machine room 200, and a path through which the air moves from the machine room 200 to the left side and then exhausted through the exhaust port 6.

The above-described paths are configurations that satisfy the spatial integration for perfectly performing the operation of the vehicle refrigerator while mounting the refrigerant system in the narrow space.

Power for drawing the air flow may be generated by the condensation fan 501 provided in the condensation module 500. Thus, in view of the flow path of air, the air to be suctioned into the condensation fan 501 may be disposed outside the machine room 200. The discharged air may be blown to the inside of the machine room with respect to the condensation fan 501.

The air discharged from the condensation fan 501 may be discharged only through the passage guide 81.

The reason is for preventing the hot air discharged to the outside of the machine room cover 700 does not recirculate to the suction-side of the condensation fan 501. For this, the inside of the machine room 200 surrounded by the machine room cover 700 may not communicate with the other sides except for the passage guide 81.

As may be seen, the air discharged from the inside of the machine room 200 may not be discharged to the outside of the console space 4, but flow again into the inside of the machine room 200 to have great influence on the efficiency reduction of the refrigeration system.

In order to prevent this influence, the air in the machine room 200 may be discharged only through the flow guide 81 and not discharged to the other parts, and the air discharged through the flow guide 81 may be smoothly discharged to the exhaust port 6. If the air discharged through the passage guide is stagnated in the console space 4 without being discharged through the exhaust port 6, some of the air may eventually flow into the machine room 200. This causes severe cooling efficiency deterioration.

When a fan rate of the condensation fan 501 increases, efficiency of the system may be obtained even though the recirculation air exists. However, when a rotation rate of the condensation fan 501 increases, a loud noise is generated, and the noise is inconvenient to the driver. The vehicle refrigerator 7 according to an embodiment is adjacent to the driver since the vehicle refrigerator 7 is installed in the console 3. Therefore, the noise problem becomes more serious. Due to such a background, the maximum rotation rate of the condensation fan 501 is preferably limited to about 2,000 rpm.

Figure 7:
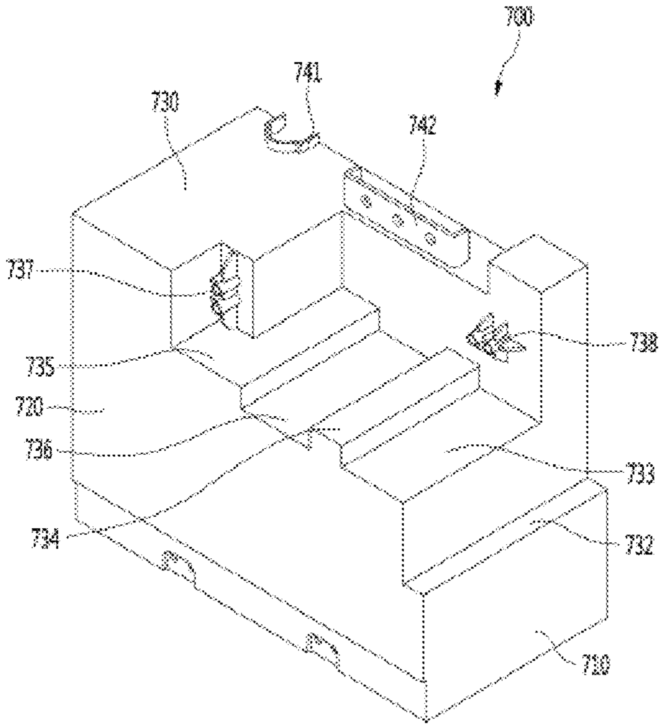
FIG. 7 is a front perspective view of the machine room cover.

FIG. 7 is a front perspective view of the machine room cover.

Referring to FIG. 7, the machine room cover 700 has a front surface 710, a top surface 730, and a left surface or side surface 720 as described above. A hole may be defined in a rear surface 750 to allow air to be introduced.

The inner space of the machine room 200 may be defined by the machine room cover 700, and the right and bottom surfaces of the machine room cover 700 may be opened or provided as empty spaces. The right surface of the machine room 200 becomes or is provided by the right surface of the cavity 100, and the bottom surface of the machine room 200 may be the bottom of the machine room 200 or the machine room bottom frame 210. According to the above-described constituents, the inner space of the machine room 200 may be defined.

The upper surface 730 is provided with stepped parts 732, 733, and 735 to smoothly flow the air and prevent problem in positions of the internal parts disposed inside the machine room 200 and the external parts disposed outside the machine room 200 from occurring.

A controller placing part 734 protruding upward from a top surface of the second stepped part 733 is provided. A top surface of the controller placing part 734 and a bottom surface of the third stepped part 735 may have the same height. Thus, the controller 900 may be disposed in a horizontal or level state.

A recess part 736 having the same height as the top surface of the second stepped part 733 may be defined between the controller placing part 734 and the bottom surface of the third stepped part 735. The recess part 733 may provide a space through which air below the controller 900 flows, and external air may be introduced into or discharged from the space. Thus, cooling of the controller 900 may be performed through the upper portion and the lower portion thereof. Thus, the cooling of the controller 900 may be more smoothly performed, and an operation temperature of the controller 900 may be satisfied in the narrow space within the console 3.

The machine room cover 700 may be coupled to an outer wall of the vacuum adiabatic body 101 defining the cavity 100. For this, a cavity coupling part 742 may be disposed at the right side on a second top surface 740 higher than the top surface 730 of the machine room cover 700, and the machine room cover 700 and the cavity 100 may be provided as one body.

Since the machine room cover 700 completely seals a left surface of the cavity 100, the air within the machine room 200 may not leak to the outside. Thus, the recirculation of the air may be prevented to improve the cooling efficiency.

The controller 900 is installed in the inner spaces between or above the second stepped part 733 and the third stepped part 735. The controller 900 is coupled and fixed to the machine room cover 700, and controller coupling parts 737 and 738 for the coupling of the controller are provided.

A through-hole 741 guiding the refrigerant conduit 600 that guides the refrigerant into the cavity 100 through the upper opening of the cavity is defined in the right side of the machine room cover 700. The refrigerant conduit 600 passing through the through-hole 741 may correspond to the regeneration conduit adiabatic member or regeneration adiabatic member 651. The regeneration conduit adiabatic member may be a member for thermally insulating a regeneration conduit system that exchanges heat of the first refrigerant conduit, which is introduced into the evaporation module 400, and heat of the second refrigerant conduit, which is discharged from the evaporation module 400.

The regeneration conduit system (i.e., the regeneration adiabatic member 651 and the first and second refrigerant conduits) may constitute a portion of the refrigerant conduit 600.

Figure 8:
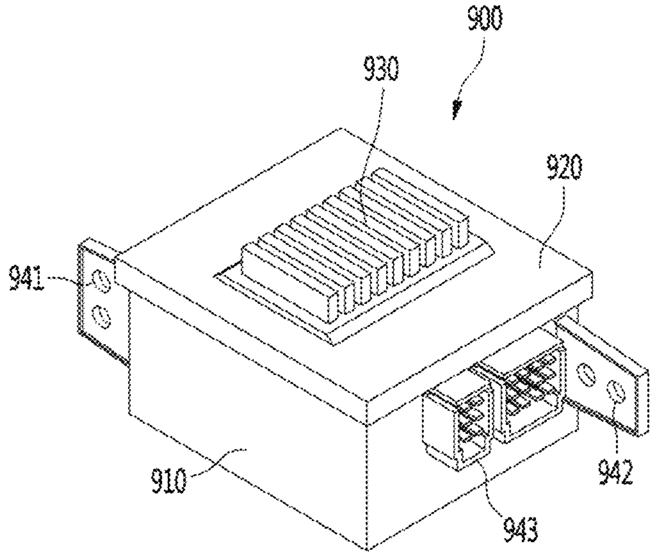
FIG. 8 is a perspective view of a controller.
Figure 9:
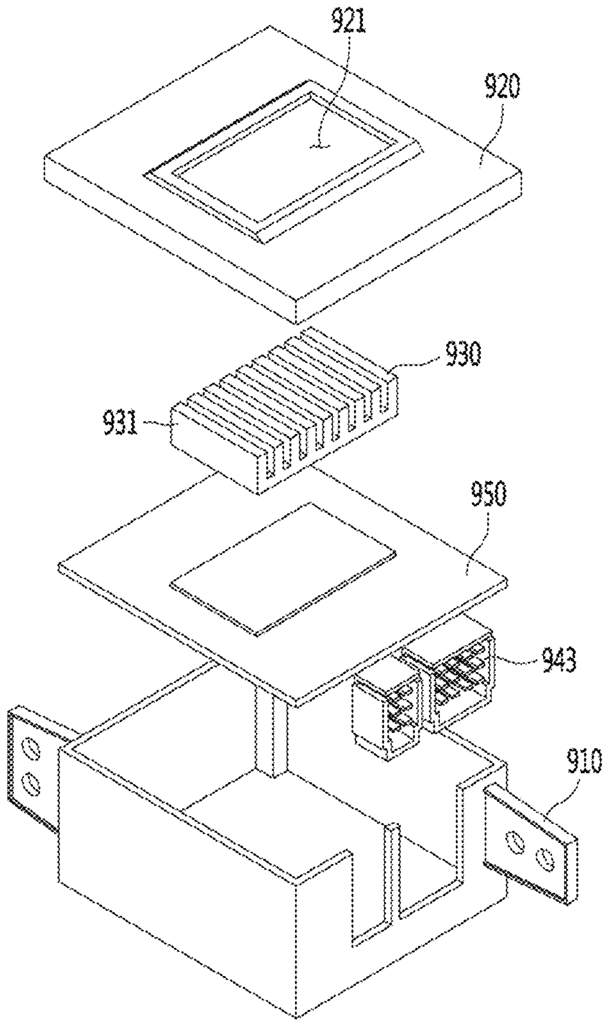
FIG. 9 is an exploded perspective view of the controller.

FIG. 8 is a perspective view of the controller, and FIG. 9 is an exploded perspective view of the controller.

Referring to FIGS. 8 and 9, the controller 900 includes a lower case 910 and an upper cover 920, which provide an inner space.

Cover coupling parts 941 and 942, which are aligned with the control coupling parts 737 and 738 of the machine room cover 700, may be provided in the lower case 910 and be horizontally seated on the top surface of the machine room cover 700. As an example, the cover coupling parts 941 and 942 may be brackets with holes, and controller coupling parts 737 and 738 may include pins or shafts that are inserted into the holes of the cover coupling parts 941 and 942. A connection terminal 943 may be disposed on one side of the lower case 910 to perform electrical connection of a power source and a sensor.

All electrical connection terminals provided in the vehicle refrigerator 7 may use a double lock connection terminals so as not to release the coupling due to the driving of the vehicle and vibration due to the driving.

A control board 950 is disposed in an inner space defined by the lower case 910 and the upper cover 920.

A plurality of heat generation sources are mounted on the control board 950. Among them, the compressor driving circuit for driving the compressor 201 includes a switching circuit, and a large amount of heat is generated because relatively large current flows through the compressor 201.

The compressor driving circuit is generally coupled to a side surface of the compressor 201. However, in the case of the embodiment, since the inner space of the machine room 200 is narrow as the vehicle refrigerator 7, and the position of the compressor 201 is located just before the discharge of the machine room 200, the temperature of the air flowing is high. Thus, it is inappropriate to install the compressor driving circuit in a space close to the compressor 201.

As a solution to this problem, if the compressor driving circuit is provided together with the control board 950 that controls the whole of the vehicle refrigerator 7, the space of the vehicle refrigerator 7 may be more compact. However, it is preferable that a heat dissipation structure having high cooling efficiency is provided because a large amount of heat further increases by mounting a plurality of parts on the narrow control board 950, which may affect the operation of the parts.

To solve this problem, a heat sink 930 is provided which comes into contact with a heat generation portion of the control board 950 to promote the heat radiation of the control board 950. A cover hole 921 that is opened to a top surface is provided in the upper cover 920. The heat sink 930 is exposed to the outside through the cover hole 921.

The exposed heat sink 930 is cooled by the air passing through the spacing part between the machine room cover 700 and the console cover 300. In the spacing part between the machine room cover 700 and the console cover 300, relatively cool air in which the air introduced into the console space 4 does not cool other parts, flows. Therefore, the cooling action of the heat sink 930 may be smoothly performed. Moreover, the control board 950 may be smoothly cooled to improve operational reliability. The heat sink 930 may include a plurality of fins 931.

A configuration of the controller 900 will be described in more detail.

Figure 10:
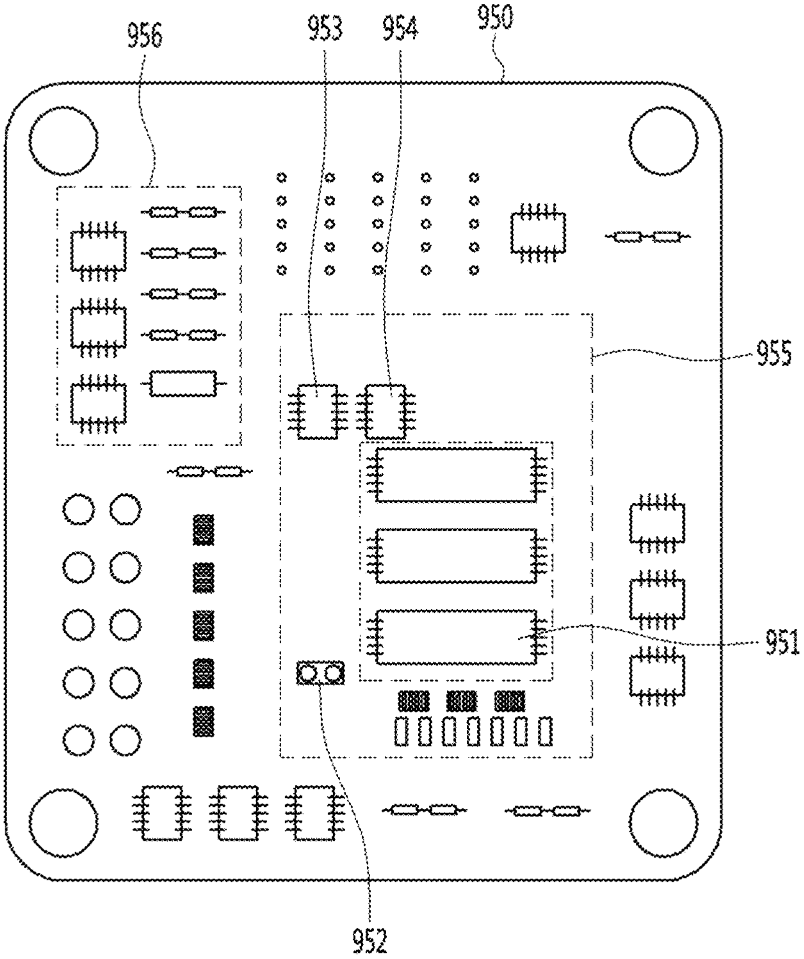
FIG. 10 is a schematic circuit diagram of a control board.

FIG. 10 is a schematic circuit diagram of the control board.

Referring to FIG. 10, the control board 950 includes a refrigerator control circuit 956 for controlling an operation of the vehicle refrigerator 7 and a compressor control circuit 951 for controlling an operation of the compressor 201.

The refrigerator control circuit 956 may perform functions such as door opening/closing, a fan operation, data storage, state determination, and a command. The compressor control circuit 951 is configured to control rotation of a motor of the compressor 201 and has a high heat generation value due to execution of the switching operation and supply of the driving current.

High-temperature heat generated in the compressor control circuit 951 affects other circuits of the control board 950 and causes a risk of fire. Thus, a temperature sensor 952 is provided in the vicinity of the compressor control circuit 951 to stop the compressor 201 when the temperature sensor 952 senses a temperature equal to or higher than a threshold or predetermined value. Therefore, it is important that the temperature sensor 952 should not rise above the threshold value.

Another circuit part having a high heat generation value in the control board is a DC-DC converter 953 and a diode 954 for boosting a voltage from about 12 volts to about 40 volts. Although these parts are not the same as the compressor control circuit 951, the parts act as large factors of the temperature rise, and if the parts do not operate normally, the parts may lead to malfunction of the vehicle refrigerator 7.

A region including the compressor control circuit 951 and the temperature sensor 952 and also including the DC-DC converter 953 and the diode 954 is referred to as a heat sink corresponding portion or a heat sink pad 955, and the heat sink 930 may come into direct or indirect contact with the region corresponding to the heat sink corresponding portion 955.

As described above, since an installation place of the heat sink 930 is a place where relatively cool air flows as the outer space of the machine room cover 700, the cooling operation through the heat sink 930 may be performed smoothly. Thus, the cooling of the heat generation parts may be smoothly performed.

Figure 11:
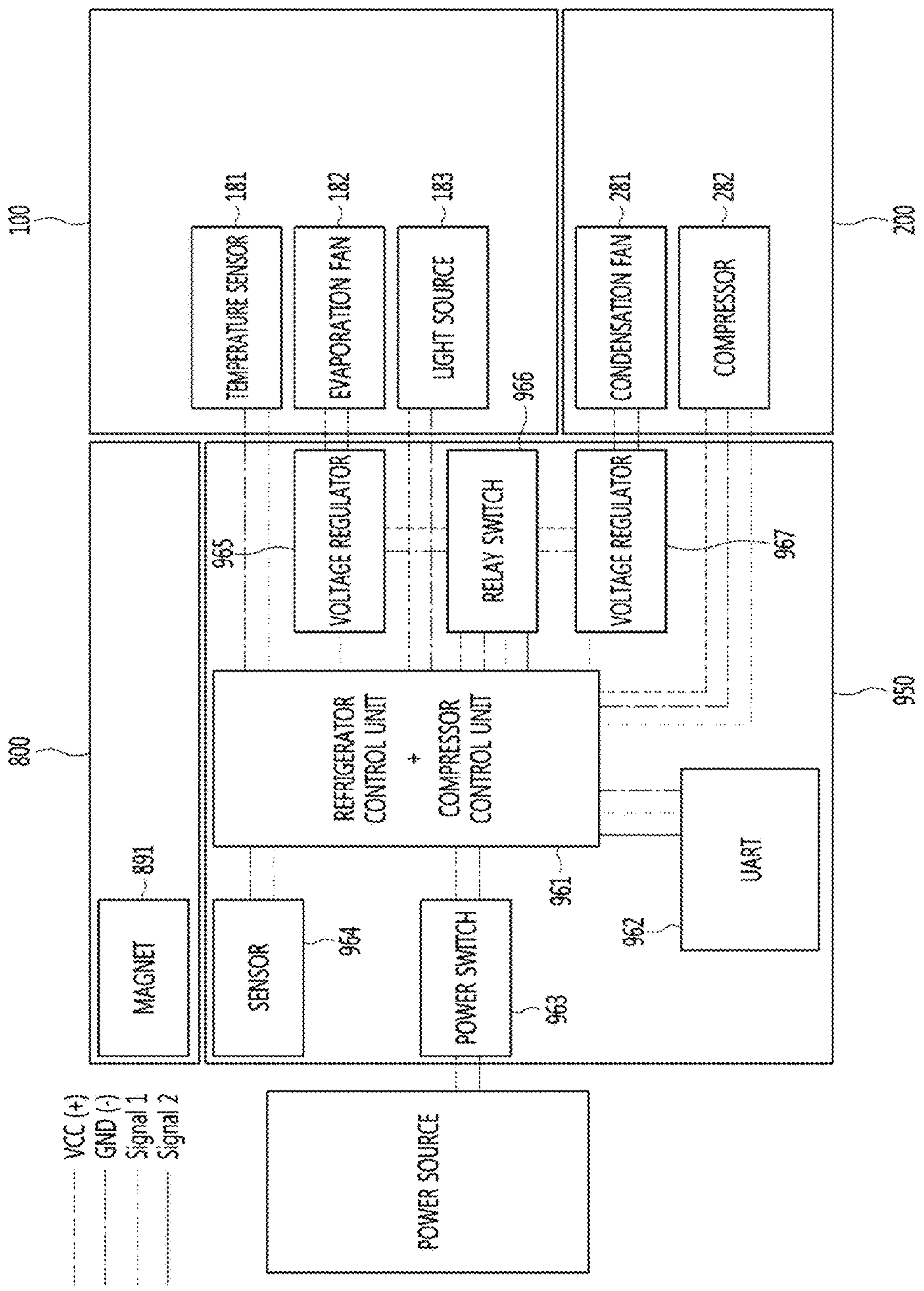
FIG. 11 is a block diagram for explaining control of the vehicle refrigerator.

FIG. 11 is a block diagram for explaining control of the vehicle refrigerator.

Referring to FIG. 11, the vehicle refrigerator 7 may be divided into a cavity or compartment 100, a machine room 200, a door 800, and a control board 950 for controlling the cavity 100, the machine room 200, and the door 800 according to control functions.

The cavity 100 is provided with a temperature sensor 181 for measuring a temperature in the cavity 100, an evaporation fan 182 included in the evaporation module 400 to cause cold air circulation inside the cavity 100, and a light source 183 that brightens the inside of the cavity 100. Each of the parts is controlled by a control unit or module 961 of the control board 950.

A condensation fan 281 (condensation fan 501 in FIG. 3) that draws an air flow inside the machine room 200 and a compressor 282 (compressor 201 in FIG. 3) that draws a refrigerant flow from the refrigeration system are provided in the machine room 200. The condensation fan 281 and the compressor 282 are controlled by the control unit 961.

A magnet 891 may be installed on the door 800, and a corresponding operation may be performed by the controller 961 when the access or strength of the magnet 891 is detected by a sensor 964.

A relay switch 966 operates under the control of the control unit 961, and voltage regulators 965 and 967 control an operation of fans 182 and 281.

A Universal Asynchronous Receiver/Transmitter (UART) port for inputting data may be provided on the control board 950. Necessary data may be stored by the UART port.

A power switch 963 for interrupting power supplied from a 12-volt power source is disposed on the control board 950.

The control unit 961, e.g., a processor, may be provided with a refrigerator control unit (refrigerator controller) and a compressor control unit (compressor controller) in a single chip.

When the control unit 961 is interpreted as a single physical chip, a compressor control circuit for switching the compressor 282 and supplying a high voltage to the compressor 282 is provided in plurality of chips on the board between the compressor 282 and the controller 961. The compressor control circuit 951 may operate by a control command of the control unit 961 to supply energy to the compressor 282.

An operation of each part will be described sequentially.

When the vehicle refrigerator normally operates, i.e., in a state in which the door 800 is not opened, the compressor 282, the condensation fan 281, and the evaporation fan 182 may operate to correspond to a temperature inside the cavity 100. Of course, an intermittent operation may naturally occur depending on an operation state such as a supercooled state. The intermittent operation is sensed by the temperature sensor 181 and then controlled. An on/off operation of the compressor 282, the condensation fan 281, and the evaporation fan 182 may not be said to be performed together, and an on/off state may be different depending on a flow of the refrigerant and the current temperature.

When the door 800 is opened during the operation of the vehicle refrigerator 7, the sensor 964 senses a change in magnetic field due to disengagement or approach of the magnet 891, which may be determined as opening of the door 800. Thereafter, the compressor 282 may be turned off, or the fans 182 and 281 may be stopped. When the opening of the door 800 is sensed, the evaporation fan 182 may be turned off at all times. This is for preventing cold air from being lost.

Hereinafter, a detailed description will be given of a passage of air discharged through the passage guide 81 and a method for suppressing the recirculation of machine room discharge air.

Figure 12:
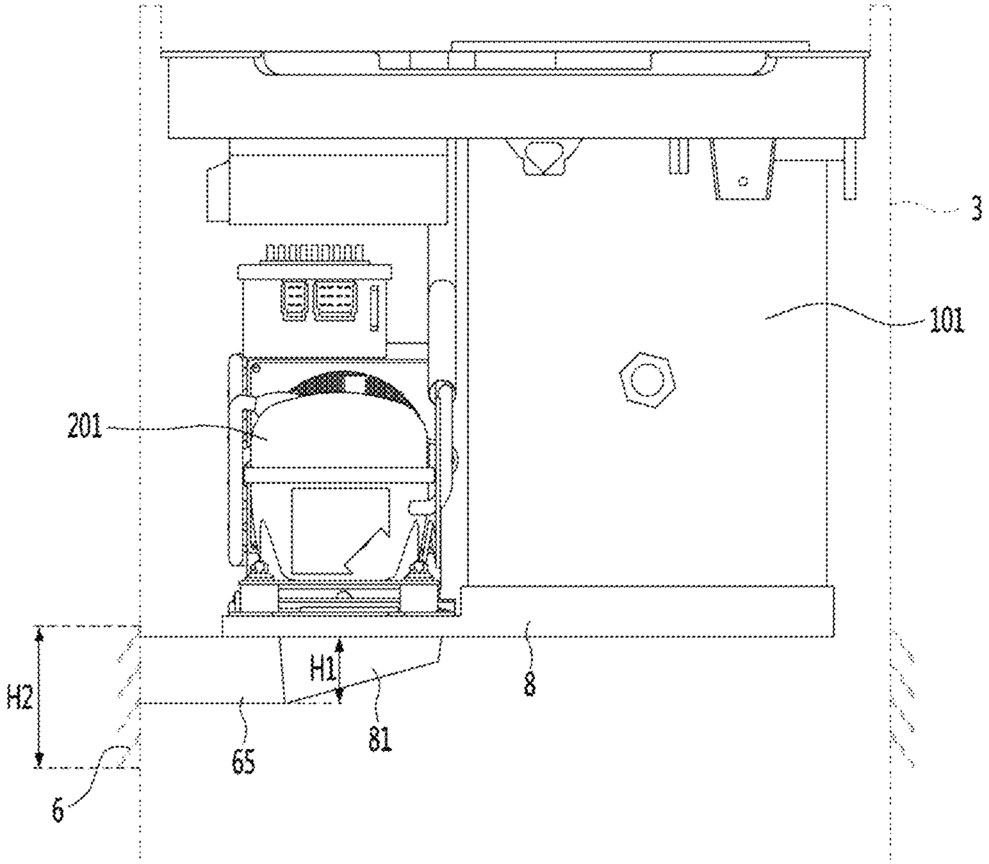
FIG. 12 is a front view of the vehicle refrigerator.

FIG. 12 is a front view of the vehicle refrigerator.

Referring to FIG. 12, the vehicle refrigerator 7 is disposed in the console space 4. The air inside the machine room 200, which passes through a previously set path, is directed to the exhaust port 6 through the passage guide 81.

The passage guide 81 is provided to be recessed in the refrigerator bottom frame 8, and at least a portion thereof is provided to be inclined in a direction toward the exhaust port 6.

A connection passage 65 may be provided in a path between the passage guide 81 and the exhaust port 6. The connection passage 65 is a member for connecting the passage guide 81 provided in the refrigerator bottom frame 8 to an inlet end of the exhaust port 6.

According to the connection passage 65, a laminar flow flowing through the passage guide 81 may be continuous. Thus, the air flow may be stably guided. However, it is unnecessary to ensure that the connection passage 81 comes into contact with the inlet end of the exhaust port 6. The recirculation of the machine room discharge air may be considerably attenuated by making an outlet of the connection passage 81 to be placed at a position adjacent to the inlet end of the exhaust port 6. This leads to a great effect in improving heat efficiency.

The exhaust port 6 has a height H2 greater than that H1 of the outlet end of the passage guide 81. This is intended to reduce discomfort of the assistant driver by the hot air discharged from the exhaust port 6 and to suppress recirculation of the discharged air. According to this, the air discharged from the passage guide 81 is diffused, and a flow velocity thereof is slowed down so that an effect of preventing direct contact with the assistant driver is obtained.

Figure 13:
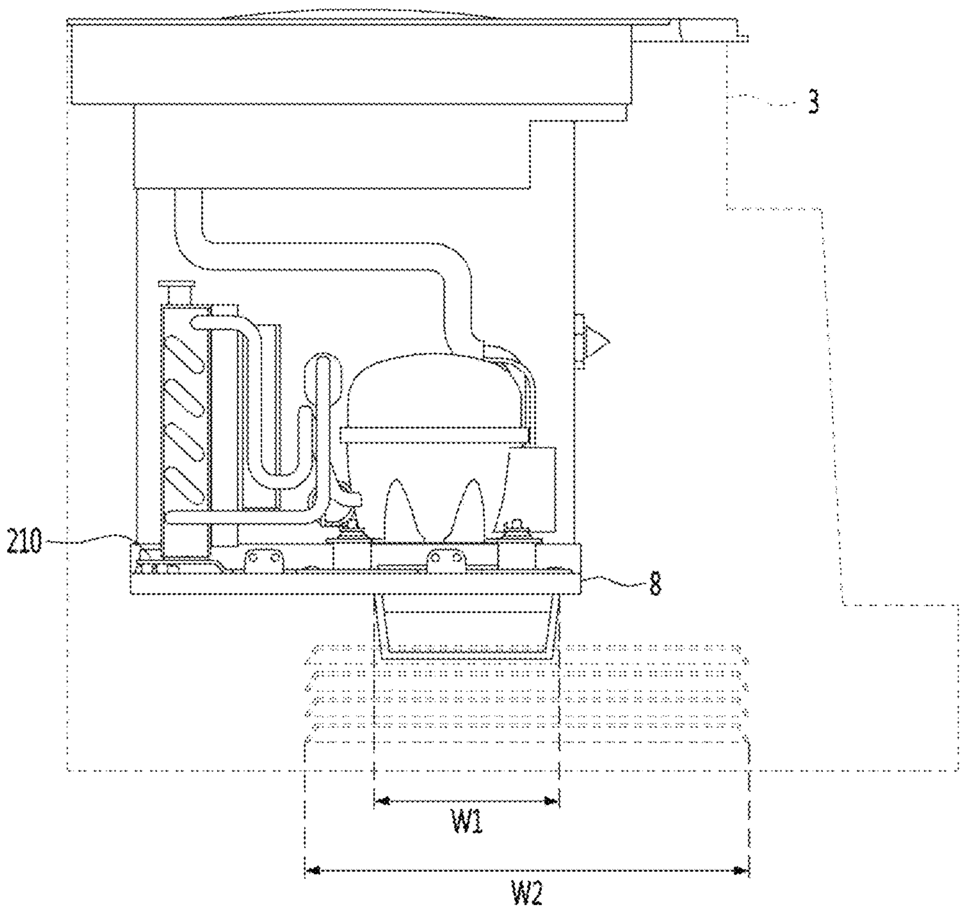
FIG. 13 is a left view of the vehicle refrigerator.

FIG. 13 is a left view of the vehicle refrigerator.

Referring to FIG. 13, the exhaust port 6 has a width W2 greater than that of the passage guide 81. According to this, the air discharged from the passage guide 81 is diffused, and a flow velocity thereof is slowed down so that an effect of preventing direct contact with the assistant driver is obtained. Also, a smooth exhaust operation may be obtained, and the recirculation of the discharged air may be suppressed.

When comparing a height of a center of the exhaust port 6 with a height of a discharge end of the passage guide 81, the center of the exhaust port 6 has a relatively low height when comparing centers of the members. This is because the air discharged from the passage guide 81 is directed downward so that natural air flow is maximized.

FIGS. 14 to 18 are diagrams of simulations for explaining various structures of the passage guide.

Figure 14:
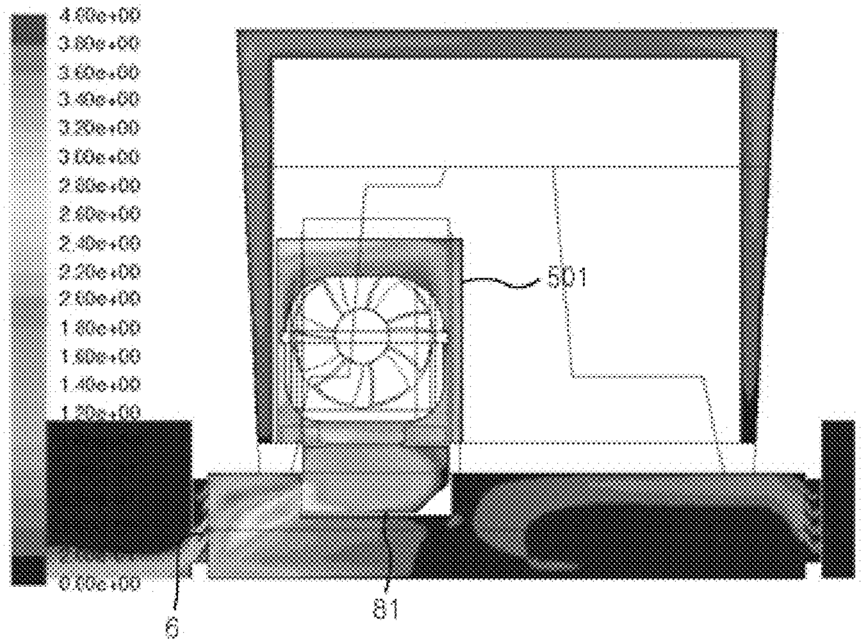
FIGS. 14 to 18 are diagrams of simulations for explaining various structures of a passage guide.

Referring to FIG. 14, the passage guide 81 according to this embodiment may have an inclined part that is gradually lowered in the left direction to guide the flow. The passage guide 81 is provided by a method such as cutting and drawing of a plate-shaped refrigerator bottom frame 8 and has a size and a structure similar to an area of the cut plate.

In this embodiment, it is seen that the air discharged from the machine room 200 is recirculated to the console space 4 through the spacing part between the refrigerator bottom frame 8 and the console space 4. The recirculated air may be reintroduced into the machine room 200 to lead to reduction in efficiency of the refrigeration system.

In drawing, a deep blue is a portion without flow, and the thicker the red, the faster the flow. This also applies to other drawings.

Figure 15:
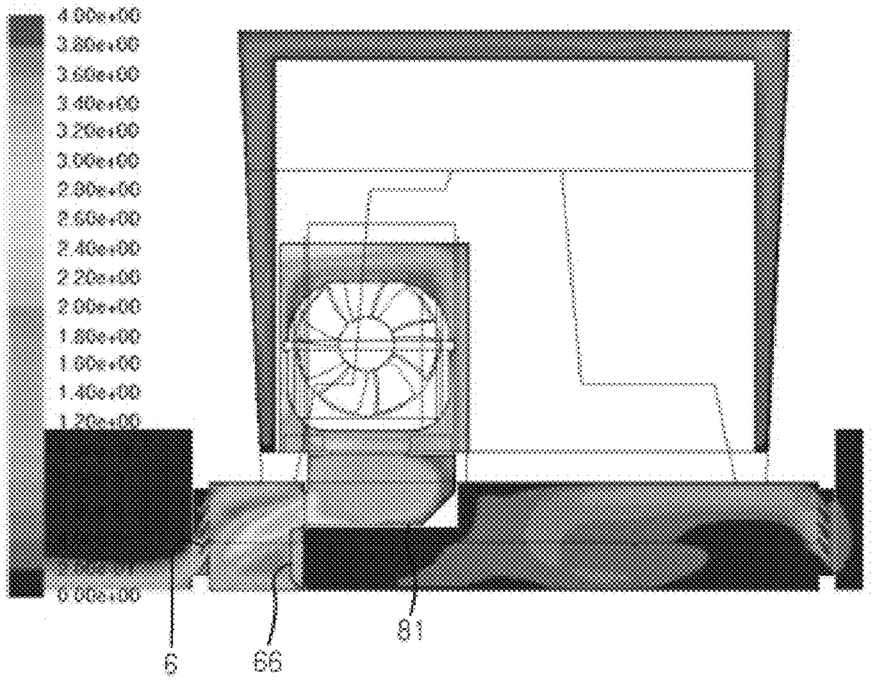

Referring to FIG. 15, the passage guide 81 of this example has the inclined part that is lowered in the left direction to guide the flow and is provided by a method such as cutting and drawing in the plate-like refrigerator bottom frame 8 to provide a size and structure similar to those of the area of the cut plate. Also, a blocking wall 66 extending downward from a lower end of the discharge end of the passage guide 81 is provided.

The spacing part between the refrigerator bottom frame 8 and the console space 4 is blocked by the blocking wall 66, and the discharged air does not flow therebetween. Thus, hot air recirculated to the machine room 200, i.e., the inlet side of the condensation module 500, may be removed.

The blocking wall 66 may be a preferred means for preventing the recirculation of the exhaust air of the machine room 200.

Figure 16:
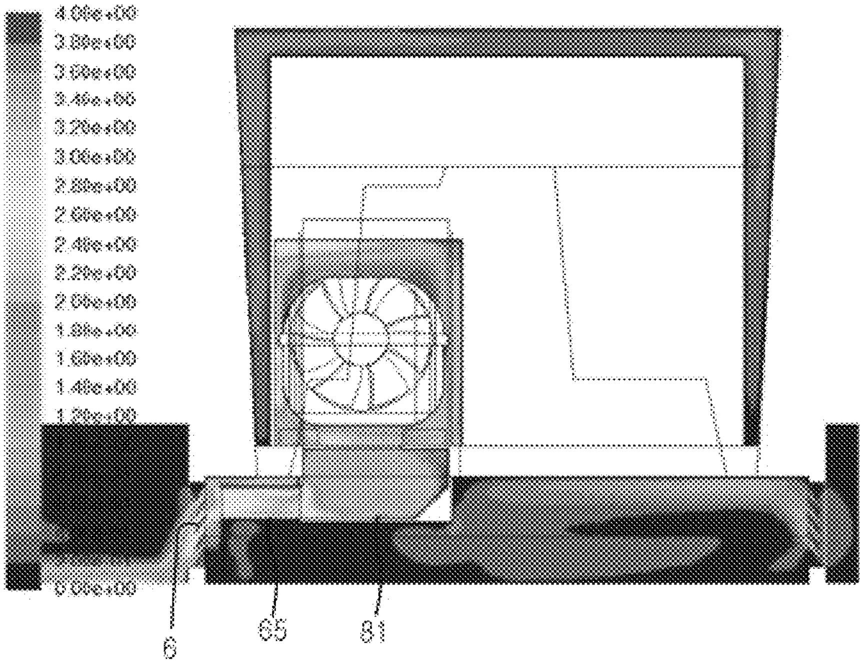

Referring to FIG. 16, the passage guide 81 of this example has the inclined part that is lowered in the left direction to guide the flow and is provided by a method such as cutting and drawing in the plate-like refrigerator bottom frame 8 to provide a size and structure similar to those of the area of the cut plate. Also, the connection passage 65 further extending to the exhaust port 6 of the discharge end of the passage guide 81 is provided.

The connection passage 65 extends to the vicinity of the inlet end of the exhaust port 6 and does not come into contact with the exhaust port 6. This is because the discharged air of the connection passage 65 is directly discharged through the exhaust port 6, thereby preventing a large flow rate from being generated and causing the user to feel uncomfortable. Also, it is possible to prevent the recirculation of the machine room 200 discharge air by such a structure.

The outlet side of the connection passage 65 may have a size greater than that of the inlet side of the connection passage 65. In this case, the connection passage 65 may act as a diffuser by itself. The outlet end of the connection passage 65 may be aligned with the size of the exhaust port 6, and the outlet end of the connection passage 65 may come into contact with the inlet end of the exhaust port 6 when the diffuser is employed. In this case, the discomfort of the assistant driver may be eliminated.

Figure 17:
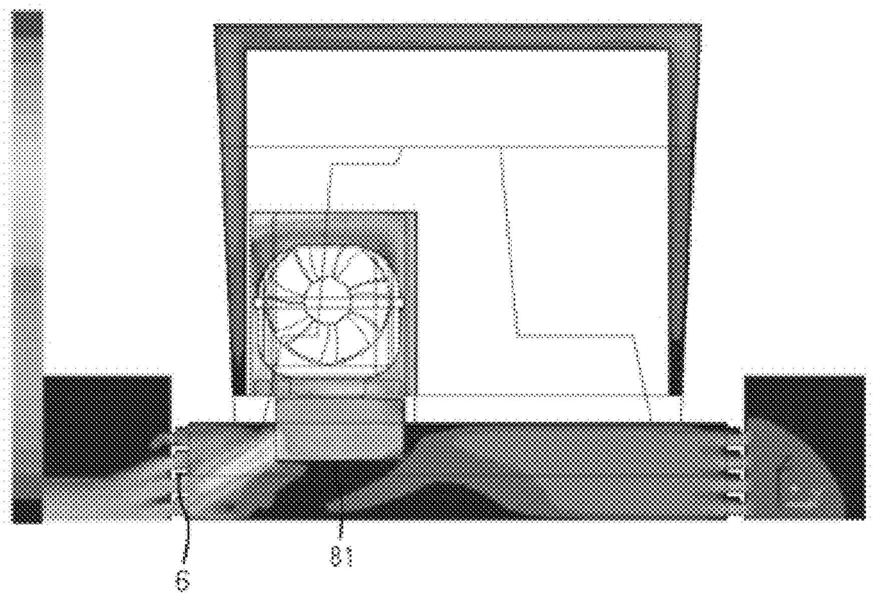

Referring to FIG. 17, the passage or flow guide 81 of this example does not have the inclined part that is lowered in the left direction and is provided by a method such as cutting and drawing in the plate-like refrigerator bottom frame 8 to provide a size and structure similar to those of the area of the cut plate.

In this embodiment, a turbulence generation inside the flow guide 81 increases, and the turbulence inside the flow guide 81 propagates to the outside. Thus, it is confirmed that the flow reaches the spacing part between the refrigerator bottom frame 8 and the console space 4, and recirculation of the machine room discharge air occurs.

As described above, the recirculation of the machine room discharge air adversely affects the heat exchange performance, the efficiency of the refrigerator deteriorates, and the internal temperature of the cavity becomes worse.

Figure 18:
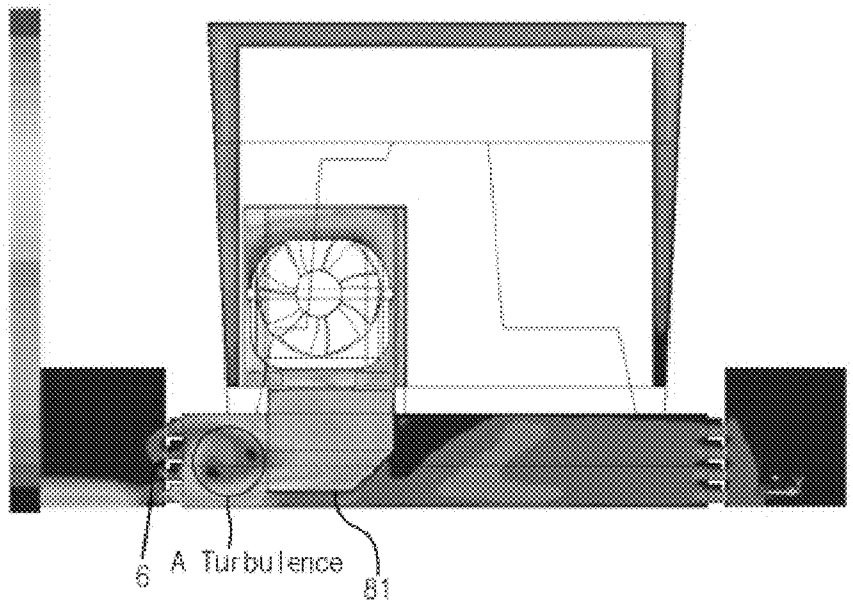

Referring to FIG. 18, the passage guide 81 according to this embodiment may have an inclined part that is gradually lowered in the left direction to guide the flow. Also, the passage guide 81 is provided by a method such as cutting and drawing in the plate-like refrigerator bottom frame 8 so as to have the size and structure similar to the area of the cut plate. In addition, the passage guide 81 is further downward so as to have a height and an up-and-down width equal to that of the exhaust port 6.

The turbulence region A is generated in the discharge part of the passage guide 81 due to the size of the excess flow guide and the influence of the turbulence region A is generated between the refrigerator bottom frame 8 and the console space 4 so that the flow reaches the spacing part. As a result, it is seen that recirculation of the discharged air occurs.

As a result of the above experiment, it was confirmed that the application of the blocking wall 66 and the connection passage 65 is a preferable means for preventing the recirculation of the machine room discharge air discharged from the discharge end of the passage guide 81.

The structure and action of the vacuum adiabatic body will be described in more detail.

Figure 19:
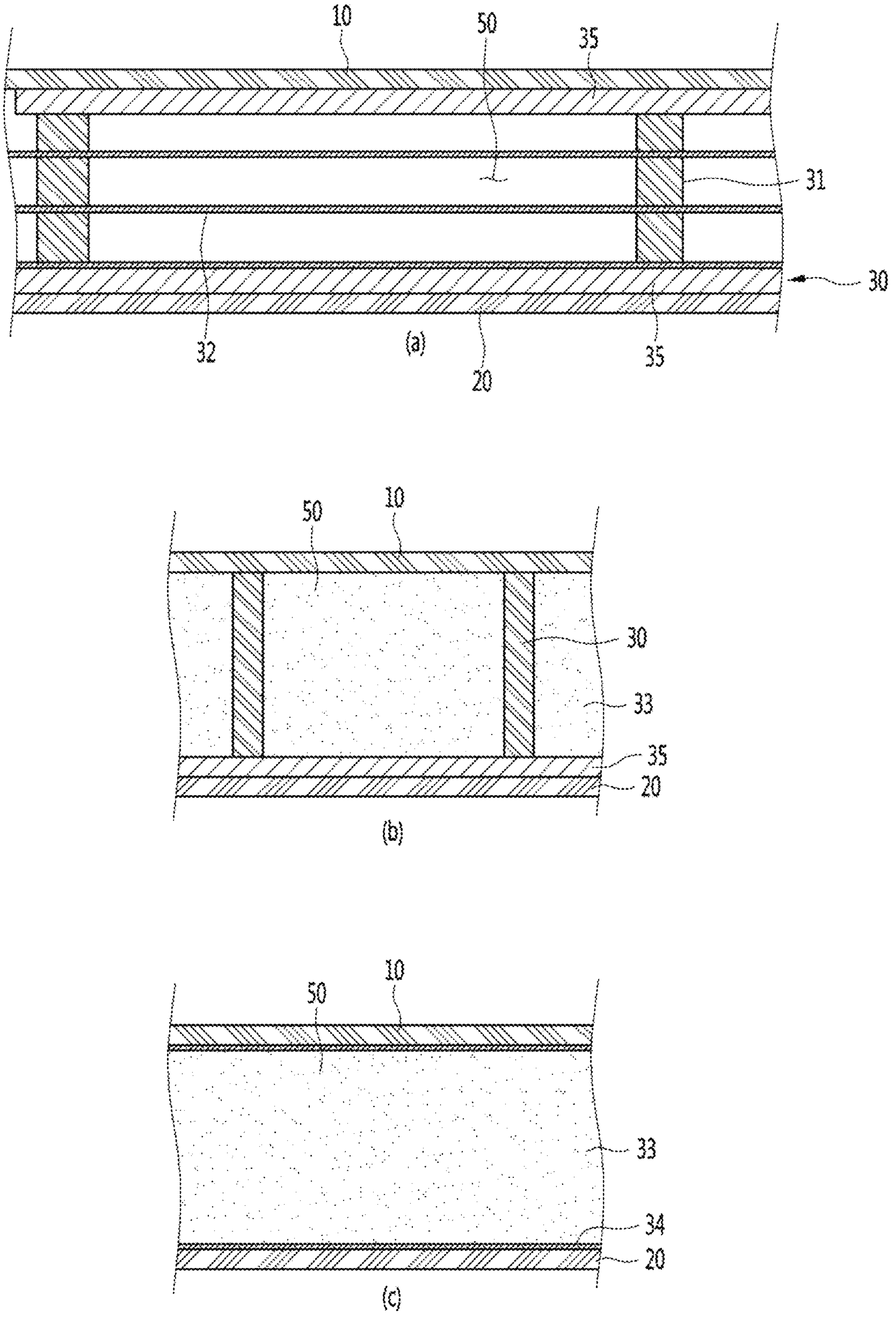
FIG. 19 is a view illustrating an internal configuration of a vacuum adiabatic body according to various embodiments.

FIG. 19 is a view illustrating an internal configuration of a vacuum adiabatic body according to various embodiments.

First, referring to FIG. 19*a*, a vacuum space part 50 is provided in a third space or a vacuum space having a different pressure from first and second spaces (i.e., spaces outside and inside the cavity 100), preferably, a vacuum state, thereby reducing adiabatic loss. The third space may be provided at a temperature between the temperature of the first space and the temperature of the second space.

A constituent that resists heat transfer between the first space and the second space may be called a heat resistance unit or assembly. Hereinafter, all various constituents may be applied, or the various constituents may be selectively applied.

The third space is provided as a space in the vacuum state. Thus, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit or bar 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20.

The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 may include a resin selected from the group consisting of polycarbonate (PC), glass fiber PC, low outgassing PC, polyphenylene sulfide (PPS), and liquid crystal polymer (LCP) so as to obtain high compressive strength, low outgassing and water absorption, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members 10 and 20, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20.

A product having a low emissivity may be preferably used as the material of the radiation resistance sheet 32. In an embodiment, an aluminum foil having an emissivity of 0.02 may be used as the radiation resistance sheet 32. Also, at least one sheet of radiation resistance sheet 32 may be provided at a certain distance so as not to contact each other. At least one radiation resistance sheet 32 may be provided in a state in which it contacts the inner surface of the first or second plate member 10 or 20. Even when the vacuum space part 50 has a low height, one sheet of radiation resistance 32 sheet may be inserted. In case of the vehicle refrigerator 7, one sheet of radiation resistance sheet 32 may be inserted so that the vacuum adiabatic body 101 has a thin thickness, and the inner capacity of the cavity 100 is secured.

Referring to FIG. 19*b*, the distance between the plate members 10 and 20 is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body 101 may be fabricated without using the radiation resistance sheet 32.

Referring to FIG. 19*c*, the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a polyethylene (PE) material, and may be provided in a state in which holes are formed therein.

In this embodiment, the vacuum adiabatic body may be fabricated without using the supporting unit 30. In other words, the porous substance 33 may simultaneously serve as the radiation resistance sheet 32 and the supporting unit 30.

Figure 20:
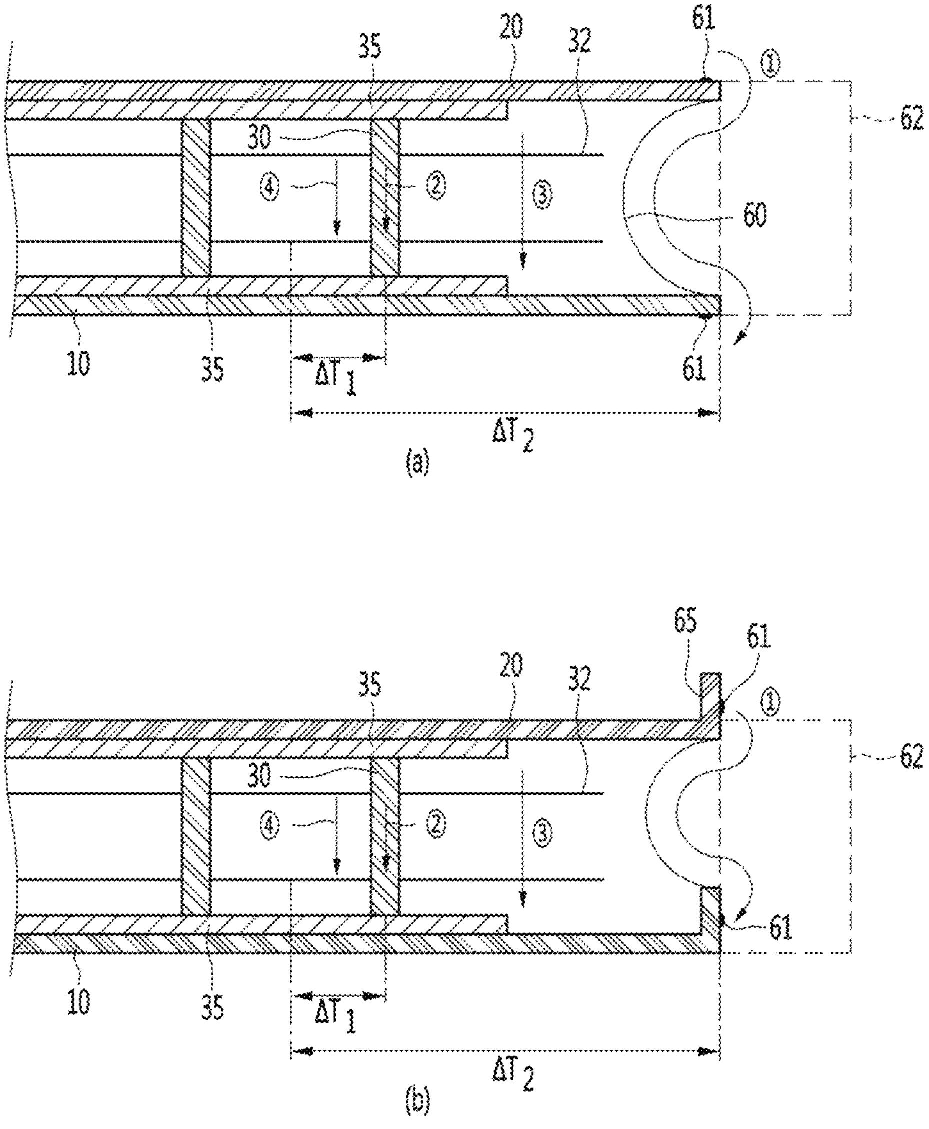
FIG. 20 is a view of a conductive resistance sheet and a peripheral portion of the conductive resistance sheet.

FIG. 20 is a view of a conductive resistance sheet and a peripheral portion of the conductive resistance sheet.

Referring to FIG. 20*a*, the first and second plate members 10 and 20 are to be sealed so as to vacuum the interior of the vacuum adiabatic body 101. In this case, since the two plate members 10 and 20 have different temperatures from each other, heat transfer may occur between the two plate members 10 and 20. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction may be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the vehicle refrigerator 7, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur.

In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60, may be provided as an adiabatic structure, e.g., a separate gasket, which is placed at the exterior of the conductive resistance sheet 60, or may be provided as the console cover 300 disposed at a position facing the conductive resistance sheet 60.

A heat transfer path between the first and second plate members 10 and 20 will be described. Heat passing through the vacuum adiabatic body may be divided into surface conduction heat $\hat{1}$ conducted along a surface of the vacuum adiabatic body 101, more specifically, the conductive resistance sheet 60, supporter conduction heat $\hat{2}$ conducted along the supporting unit 30 provided inside the vacuum adiabatic body 101, gas conduction heat $\hat{3}$ conducted through an internal gas in the vacuum space part, and radiation transfer heat $\hat{4}$ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the plate members 10 and 20 may be changed, and the length of the conductive resistance sheet 60 may be changed. The transfer heat may be changed depending on a difference in temperature between the spaces (the first and second spaces) respectively provided by the plate members 10 and 20. In the embodiment, a preferred configuration of the vacuum adiabatic body 101 has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as about 19.6 mW/m K.

By performing a relative analysis on heat transfer amounts of the vacuum adiabatic body 101 of the embodiment, a heat transfer amount by the gas conduction heat $\hat{3}$ may become smallest. For example, the heat transfer amount by the gas conduction heat $\hat{3}$ may be controlled to be equal to or smaller than 4% of the total heat transfer amount. A heat transfer amount by solid conduction heat defined as a sum of the surface conduction heat $\hat{1}$ and the supporter conduction heat $\hat{2}$ is largest. For example, the heat transfer amount by the solid conduction heat may reach 75% of the total heat transfer amount. A heat transfer amount by the radiation transfer heat $\hat{4}$ is smaller than the heat transfer amount by the solid conduction heat but larger than the heat transfer amount of the gas conduction heat $\hat{3}$. For example, the heat transfer amount by the radiation transfer heat $\hat{4}$ may occupy about 20% of the total heat transfer amount.

According to such a heat transfer distribution, effective heat transfer coefficients (eK: effective K) (W/mK) of the surface conduction heat $\hat{1}$, the supporter conduction heat $\hat{2}$, the gas conduction heat $\hat{3}$, and the radiation transfer heat $\hat{4}$ may have an order of Math Figure 1.

$$eK_{solid\ conduction\ heat} > eK_{radiation\ transfer\ heat} > eK_{gas\ conduction\ heat}$$ Math Figure 1

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body 101 is a value given by k=QL/AΔT. Here, Q denotes a calorific value (W) and may be obtained using a calorific value of a heater. A denotes a sectional area (m2) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60, a sectional area (A) of the conductive resistance sheet, a length (L) of the conductive resistance sheet, and a thermal conductivity (k) of the conductive resistance sheet 60 (the thermal conductivity of the conductive resistance sheet 60 is a material property of a material and may be obtained in advance). For the supporter conduction heat, a conductive calorific value may be obtained through a temperature difference (ΔT) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat $\hat{3}$, and the radiation transfer heat $\hat{4}$ may be obtained by subtracting the surface conduction heat and the supporter conduction heat from the heat transfer amount of the entire vacuum adiabatic body. A ratio of the gas conduction heat $\hat{3}$, and the radiation transfer heat $\hat{4}$ may be obtained by evaluating radiation transfer heat when no gas conduction heat exists by remarkably lowering a vacuum degree of the vacuum space part 50.

When a porous substance 33 is provided inside the vacuum space part 50, porous substance conduction heat $\hat{5}$ may be a sum of the supporter conduction heat $\hat{2}$ and the radiation transfer heat $\hat{4}$. The porous substance conduction heat $\hat{5}$ may be changed depending on various variables including a kind, an amount, and the like of the porous substance 33.

In the second plate member 20, a temperature difference between an average temperature of the second plate 20 and a temperature at a point at which a heat transfer path passing through the conductive resistance sheet 60 meets the second plate 20 may be largest. For example, when the second space is a region hotter than the first space, the temperature at the point at which the heat transfer path passing through the conductive resistance sheet meets the second plate member 20 becomes lowest. Similarly, when the second space is a region colder than the first space, the temperature at the point at which the heat transfer path passing through the conductive resistance sheet 60 meets the second plate member 20 becomes highest.

This means that the amount of heat transferred through other points except the surface conduction heat passing through the conductive resistance sheet should be controlled, and the entire heat transfer amount satisfying the vacuum adiabatic body 101 may be achieved only when the surface conduction heat occupies the largest heat transfer amount. To this end, a temperature variation of the conductive resistance sheet 60 may be controlled to be larger than that of the plate member 20.

Physical characteristics of the parts constituting the vacuum adiabatic body 101 will be described. In the vacuum adiabatic body 101, a force by vacuum pressure is applied to all of the parts. Therefore, a material having strength (N/m2) of a certain level may be used.

Referring to FIG. 20*b*, this configuration is the same as that of FIG. 20*a* except that portions at which the first plate member 10, the second plate member 20 are coupled to the conductive resistance sheet 60. Thus, the same part omits the description and only the characteristic changes are described in detail.

Ends of the plate members 10 and 20 may be bent to the second space having a high temperature to form a flange part 65. A welding part 61 may be provided on a top surface of the flange part 65 to couple the conductive resistance sheet 60 to the flange part 65. In this embodiment, the worker may perform welding while facing only any one surface. Thus, since it is unnecessary to perform two processes, the process may be convenient.

It is more preferable to apply the case in which welding of the inside and the outside are difficult as illustrated in FIG. 12*a* because a space of the vacuum space part 50 is narrow like the vehicle refrigerator 7.

Figure 21:
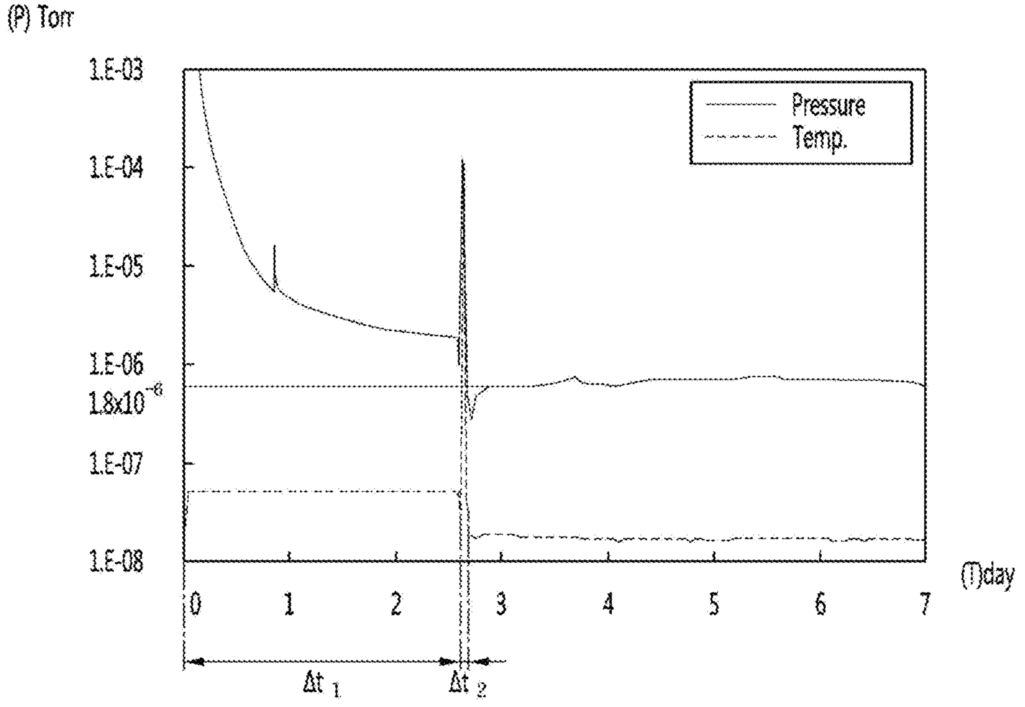
FIG. 21 is a graph illustrating results obtained by observing a time and a pressure in a process of exhausting the inside of the vacuum adiabatic body when a supporting unit is used.

FIG. 21 is a graph illustrating results obtained by observing a time and a pressure in a process of exhausting the inside of the vacuum adiabatic body 101 when a supporting unit 30 is used.

Referring to FIG. 21, in order to create the vacuum space part 50 to be in the vacuum state, a gas in the vacuum space part 50 is exhausted by a vacuum pump while evaporating a latent gas remaining in the parts of the vacuum space part 50 through heating. However, if the vacuum pressure reaches a certain level or more, there exists a point at which the level of the vacuum pressure is not increased any more (Δt1). After that, the getter is activated by disconnecting the vacuum space part 50 from the vacuum pump and applying heat to the vacuum space part 50 (Δt2). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8\times10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body 101, thereby setting the minimum internal pressure of the vacuum space part 50 to $1.8\times10^{-6}$ Torr.

Figure 22:
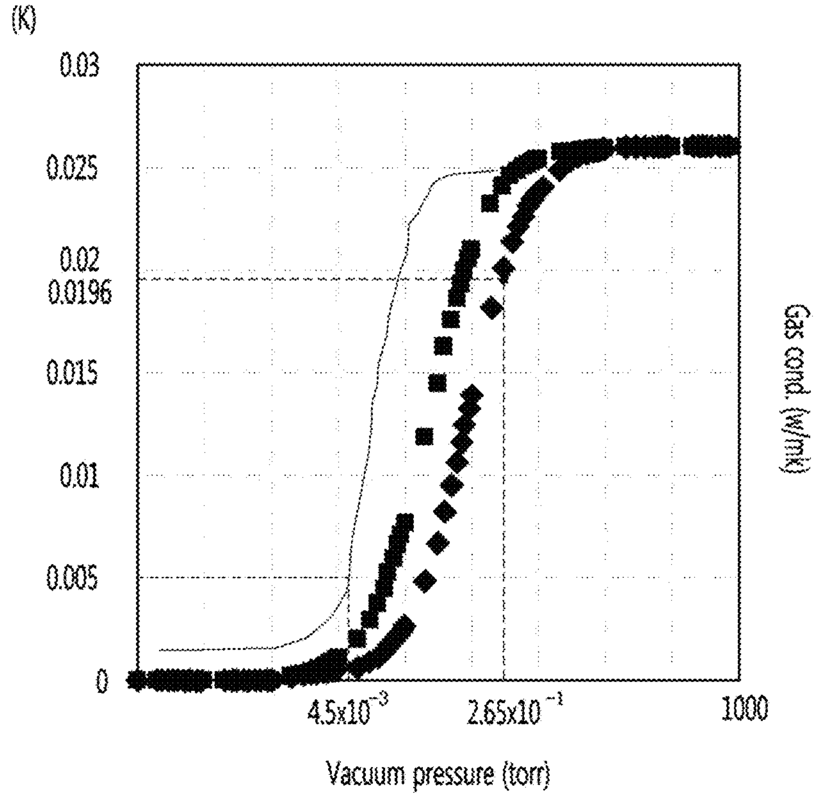
FIG. 22 is a graph obtained by comparing a vacuum pressure with gas conductivity.

FIG. 22 is a graph obtained by comparing a vacuum pressure with gas conductivity.

Referring to FIG. 22, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member 10 or 20 adjacent thereto. When the radiation resistance sheet 32 does not exist inside vacuum space part 50, the gap is a distance between the first and second plate members 10 and 20.

It may be seen that, since the size of the gap is small at a point corresponding to a typical effective heat transfer coefficient of 0.0196 W/mK, which is provided to an adiabatic material formed by foaming polyurethane, the vacuum pressure is $2.65\times10^{-1}$ Torr even when the size of the gap is 2.76 mm. Meanwhile, it may be seen that the point at which reduction in adiabatic effect caused by gas conduction heat is saturated even though the vacuum pressure is decreased is a point at which the vacuum pressure is approximately $4.5\times10^{-3}$ Torr. The vacuum pressure of $4.5\times10^{-3}$ Torr may be defined as the point at which the reduction in adiabatic effect caused by gas conduction heat is saturated. Also, when the effective heat transfer coefficient is 0.1 W/mK, the vacuum pressure is $1.2\times10^{-2}$ Torr.

When the vacuum space part 50 is not provided with the supporting unit 30 but provided with the porous substance 33, the size of the gap ranges from a few micrometers to a few hundreds of micrometers. In this case, the amount of radiation heat transfer is small due to the porous substance 33 even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0\times10^{-4}$ Torr. Also, the vacuum pressure at the point at which the reduction in adiabatic effect caused by gas conduction heat is saturated is approximately $4.7\times10^{-2}$ Torr. Also, the pressure where the reduction in adiabatic effect caused by gas conduction heat reaches the typical effective heat transfer coefficient of 0.0196 W/mK is 730 Torr.

When the supporting unit 30 and the porous substance 33 are provided together in the vacuum space part, a vacuum pressure may be created and used, which is middle pressure between the vacuum pressure when only the supporting unit 30 is used and the vacuum pressure when only the porous substance 33 is used.

Hereinafter, another embodiment will be described.

In above-described embodiment, the refrigerator applied to the vehicle has been mainly described. However, the embodiment of the present disclosure is not limited thereto. For example, the ideas of the present disclosure may be applied to a warming apparatus and a refrigerating or warming apparatus. Of course, the embodiment of the present disclosure is not limited to a vehicle, but may be applied to any apparatus that generates a desired temperature of a product. However, it would be preferable for the vehicle refrigerator.

Particularly, in the case of the warming apparatus, a direction of the refrigerant may be configured to be opposite to that of the refrigerator. In the case of the refrigerating or warming apparatus, four sides that reverse the direction of the refrigerant may be installed on the refrigerant passage according to whether the refrigerant operates as a refrigerator or a warming apparatus.

The condensation module or assembly may be referred to as a first heat exchange module or assembly, and the evaporation module or assembly may be referred to as a second heat exchange module or assembly regardless of the change of the refrigerator and the warming apparatus. Here, the first and second meanings denote the division of the heat exchange module and may be exchanged with each other.

INDUSTRIAL APPLICABILITY

According to the embodiments, the vehicle refrigerator that receives only power from the outside and is independent apparatus may be efficiently realized.

According to the present disclosure, the satisfaction of the user may be improved because the vehicle quickly provides food in a desired state by the user.

For another example, there is an example in which a refrigeration cycle using a refrigerant is applied.

Embodiments also provide a refrigerating or warming apparatus directly accessible to a driver while using refrigeration cycle, and a vehicle.

Embodiments also provide a refrigerating or warming apparatus that is capable of increasing a capacity of a refrigerator, and a vehicle.

Embodiments provide a refrigerating or warming apparatus that is capable of improving energy efficiency, and a vehicle.

In one embodiment, to be directly accessible to a driver by using a refrigeration cycle, a refrigerating or warming apparatus includes: a cavity or compartment of which at least a portion of a wall is provided as a vacuum adiabatic body; a machine room disposed at a side outside the compartment; a compressor accommodated in the machine room to compress a refrigerant; a first heat exchange module or assembly accommodated in the machine room to allow the refrigerant to be heat-exchanged; and a second heat exchange module or assembly accommodated in the cavity to allow the refrigerant to be heat-exchanged.

To increase a capacity of a refrigerator and realize high integration of the machine room, the refrigerating or warming apparatus may further include a machine room cover which covers the machine room to separate a passage and in which the internal air flow and the external air flow have directions opposite to each other.

To improve energy efficiency and heat dissipation performance, the refrigerating or warming apparatus may further include a passage guide for guiding discharge-side air of the internal air flow to the direction opposite to the cavity.

The refrigerating or warming apparatus may further include a connection passage further provided on a discharge end of the passage guide to suppress recirculation of hot air, thereby more improving the heat dissipation performance.

Inlet-side air of the external air flow may flow to the cavity to further suppress the recirculation of the hot air.

To improve energy efficiency and realize high integration of the machine room, the external air flow may have a width that gradually decreases as the air flow proceeds.

To achieve sufficient heat dissipation performance, the machine room cover may have at least two stepped parts. A controller may be disposed on the stepped part.

To improve integration, a compressor driving circuit and a refrigerating or warming apparatus control circuit may be provided together in the controller.

In another embodiment, to obtain a vehicle on which a refrigerating or warming apparatus having a quick temperature adjustment performance is mounted, the vehicle includes: a console; a suction port and an exhaust port, which are provided in left and right sides of the console; a cavity and a machine room, which are horizontally provided in an inner space of the console; a compressor and a first heat exchange module, which are provided in the machine room; and a second heat exchange module accommodated in the cavity.

To secure capacity of a refrigerator and realize high integration, the external air flow outside the machine room cover covering the machine room and the internal air flow inside the machine room cover may have directions opposite to each other.

To increase energy efficiency and secure sufficient heat dissipation performance, the vehicle may further include a passage guide provided in a refrigerator bottom frame or base to guide a flow of air discharged to the outside of the machine room to the exhaust port.

To prevent air discharged from the passage guide from recirculating, the vehicle may further include a connection passage between an inlet end of the exhaust port and a discharge end of the passage guide. The vehicle may further include a blocking wall blocking a space between a bottom of an inner space of the console and the discharge end of the passage guide.

To increase energy efficiency and secure sufficient heat dissipation performance, the passage guide may be vertically aligned with the compressor.

In further another embodiment, to safely control the refrigerating or warming apparatus, the refrigerating or warming apparatus includes: a cavity or compartment and a machine room, which are horizontally aligned with each other; a compressor accommodated in the machine room; and a machine room cover which covers the machine room to separate a passage and outside which a controller is disposed.

To realize high integration of the refrigerating or warming apparatus, the controller may include a compressor driving circuit for driving the compressor.

To secure cooling performance of the controller, air heated by cooling the controller may be introduced into the machine room.

To secure high integration of the machine room and the refrigerating or warming apparatus together with heat dissipation performance, air through which the controller and air flowing through the machine room may have directions opposite to each other.

According to the refrigerating or warming apparatus including: a cavity or compartment of which at least a portion of the wall is provided as the vacuum adiabatic body; the machine room disposed at a side of the outside of the cavity; the compressor accommodated in the machine room to compress the refrigerant; the first heat exchange module accommodated in the machine room to allow the refrigerant to be heat-exchanged; and the second heat exchange module accommodated in the cavity to allow the refrigerant to be heat-exchanged, the refrigerating or warming apparatus may be disposed at the position that is close to the driver.

The refrigerating or warming apparatus further includes the machine room cover which covers the machine room to separate the passage and in which the internal air flow and the external air flow have directions opposite to each other. Thus, the air flow within the machine room may be accurately separated to reduce the machine room, thereby increasing in capacity of the cavity.

The passage guide for guiding the discharge-side air of the internal air flow to the direction opposite to the cavity may be provided. Thus, the hot air may not be applied to the cavity to reduce the heat load.

Since the width of the air flow decreases as the external air flow proceeds, the sufficient space for cooling each of the parts provided inside and outside the machine room and dissipating the heat of the parts may be secured.

The controller may be disposed on the stepped part of the machine room cover, and the compressor driving circuit for driving the compressor and the refrigerating or warming apparatus driving circuit may be provided together in the controller to further improve the integration of the refrigerating or warming apparatus and the operation reliability of the refrigerating or warming apparatus.

The vehicle may include the console; the suction port and the exhaust port, which are provided in the left and right sides of the console; the cavity and the machine room, which are horizontally provided in the inner space of the console; the compressor and the first heat exchange module, which are provided in the machine room; and the second heat exchange module accommodated in the cavity may be provided. Thus, the user of the vehicle may quickly access the accommodated product at the desired temperature condition.

The external air flow outside the machine room cover covering the machine room and the internal air flow inside the machine room cover may have the directions opposite to each other. Thus, the refrigeration cycle may be sufficiently accommodated in the narrow space.

The high-temperature air may be prevented from influencing the cavity by the passage guide for guiding the passage of the air discharged to the outside of the machine room toward the exhaust port.

The passage guide may be vertically aligned with the compressor to quickly discharge the air and realize the high-integration of the machine room.

The refrigerating or warming apparatus may include the cavity and the machine room, which are horizontally aligned with each other; the compressor accommodated in the machine room; and the machine room cover which covers the machine room to separate the passage and outside or on top of which the controller is disposed may be provided. Thus, the controller may be prevented from being broken down in the narrow space to stably drive the refrigerating or warming apparatus.

The compressor driving circuit for driving the compressor may be provided in the controller to further reduce the inner space of the machine room.

The air flowing through the controller may be introduced into the machine room to satisfy the heat dissipation conditions of the controller.

Since the air flowing through the controller and the air flowing through the machine room are provided in opposite directions, the inner and outer spaces of the narrow machine room may be sufficiently utilized to perform the cooling.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerating or warming apparatus comprising:
- a compartment having a wall that includes a vacuum adiabatic body;
- a machine room provided at a side outside the compartment;
- a compressor provided in the machine room to compress a refrigerant;
- a first heat exchange assembly provided in the machine room to allow the refrigerant to be heat-exchanged;
- a second heat exchange assembly provided in the compartment to allow the refrigerant to be heat-exchanged;
- a machine room cover which covers the machine room to separate air flow passages;
- a console provided to accommodate the machine room cover and the compartment;
- a suction port provided in a first side of the console; and
- a console cover provided on an upper edge of the compartment to seal the compartment;
- wherein air suctioned from the suction port to flow outside of a wall defining the compartment flows backward from a front side of the console cover and is introduced into a rear of the machine room.

2. The refrigerating or warming apparatus according to claim 1, wherein an external air flow outside of the machine room cover and an internal air flow inside of the machine room cover have directions opposite to each other.

3. The refrigerating or warming apparatus according to claim 1, wherein a passage guide provided near the compressor to discharge air of an internal air flow in a direction away from the compartment.

4. The refrigerating or warming apparatus according to claim 1, further comprising an exhaust port provided in a second side of the console.

5. The refrigerating or warming apparatus according to claim 1, wherein the console has a console space, and
- wherein the refrigerating or warming apparatus further comprises a refrigerant bottom frame provided in the console space.

6. The refrigerating or warming apparatus according to claim 1, wherein the vacuum adiabatic body comprises:
- a first plate to have a first temperature;
- a second plate to have a second temperature different than the first temperature; and
- a vacuum space provided between the first plate and the second plate.

7. The refrigerating or warming apparatus according to claim 6, further comprising a support provided to reduce a deformation of the vacuum space, and including a bar.

8. The refrigerating or warming apparatus according to claim 7, further comprising a support plate provided at at least one end of the bar.

9. The refrigerating or warming apparatus according to claim 6, further comprising a support configured to maintain a distance between the first plate and the second plate, and a porous material filled in the vacuum space.

10. The refrigerating or warming apparatus according to claim 9, wherein the support includes a bar.

11. The refrigerating or warming apparatus according to claim 10, further comprising a support plate provided at at least one end of the bar.

12. The refrigerating or warming apparatus according to claim 6, further comprising a porous material configured to maintain a gap of the vacuum space and provided in a compressed state.

13. The refrigerating or warming apparatus according to claim 6, further comprising at least two sheets provided to be spaced apart from each other.

14. The refrigerating or warming apparatus according to claim 6, further comprising at least one sheet provided to be in contact with an inner surface of at least one of the first plate or the second plate.

15. A refrigerating or warming apparatus comprising:

a compartment having a wall that includes a vacuum adiabatic body;

a machine room provided at a side outside the compartment;

a compressor provided in the machine room to compress a refrigerant;

a first heat exchange assembly provided in the machine room to allow the refrigerant to be heat-exchanged;

a second heat exchange assembly provided in the compartment to allow the refrigerant to be heat-exchanged;

a console provided to accommodate the machine room cover and the compartment;

a suction port provided in a first side of the console; and a console cover provided on an edge of the compartment to seal the compartment, wherein air suctioned from the suction port to flow outside of a wall defining the compartment flows backward from a front side of the console cover and is introduced into a rear of the machine room.

16. The refrigerating or warming apparatus according to claim 15, wherein the vacuum adiabatic body comprises:

a first plate to have a first temperature;

a second plate to have a second temperature different than the first temperature; and a vacuum space provided between the first plate and the second plate.

17. The refrigerating or warming apparatus according to claim 16, further comprising a support provided to reduce a deformation of the vacuum space and including a bar, wherein the support includes a support plate provided at at least one end of the bar.

18. The refrigerating or warming apparatus according to claim 16, further comprising a porous material configured to maintain a gap of the vacuum space, and provided in a state to be compressed.

19. The refrigerating or warming apparatus according to claim 16, further comprising at least two sheets provided to be spaced apart from each other.

20. The refrigerating or warming apparatus according to claim 16, further comprising at least one sheet provided to be in contact with an inner surface of at least one of the first plate or the second plate.

* * * * *